(12) United States Patent
Koshiyama

(10) Patent No.: US 9,321,307 B2
(45) Date of Patent: Apr. 26, 2016

(54) BICYCLE RIM

(71) Applicant: Kazuki Koshiyama, Osaka (JP)

(72) Inventor: Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 465 days.

(21) Appl. No.: 13/705,335

(22) Filed: Dec. 5, 2012

(65) Prior Publication Data

US 2014/0152080 A1 Jun. 5, 2014

(51) Int. Cl.
*B60B 21/10* (2006.01)
*B60B 1/00* (2006.01)
*B60B 21/02* (2006.01)
*B60B 21/04* (2006.01)

(52) U.S. Cl.
CPC ............... *B60B 21/10* (2013.01); *B60B 1/003* (2013.01); *B60B 21/025* (2013.01); *B60B 21/04* (2013.01); *B60B 21/104* (2013.01); *B60Y 2200/13* (2013.01)

(58) Field of Classification Search
CPC ...... B60B 21/00; B60B 21/02; B60B 21/025; B60B 21/026; B60B 21/028; B60B 21/04; B60B 21/10; B60B 21/102; B60B 21/108; B60B 21/125; B60C 15/024
USPC .......... 301/95.101, 95.104; 152/379.3–379.5, 152/381.4
See application file for complete search history.

(56) References Cited

U.S. PATENT DOCUMENTS

| | | | | |
|---|---|---|---|---|
| 2,198,978 | A | * 4/1940 | Sauer | 152/381.4 |
| 2,338,066 | A | * 12/1943 | Weston | 152/381.3 |
| 4,246,950 | A | * 1/1981 | Welter | 152/381.4 |
| 4,561,482 | A | * 12/1985 | Tavazza et al. | 152/381.4 |
| 4,606,390 | A | 8/1986 | Shute | |
| 6,402,256 | B1 | 6/2002 | Mercat | |
| 2008/0054711 | A1 | 3/2008 | Dal Pra' et al. | |
| 2009/0250994 | A1 | 10/2009 | Meggiolan | |

FOREIGN PATENT DOCUMENTS

| | | |
|---|---|---|
| DE | 7412165 U | 7/1974 |
| DE | 2363175 A1 | 6/1975 |
| JP | 57-37001 A | 3/1982 |

* cited by examiner

*Primary Examiner* — Jason Bellinger
(74) *Attorney, Agent, or Firm* — Global IP Counselors

(57) ABSTRACT

A bicycle rim includes a first annular side wall, a second annular side wall and an annular bridge extending between the first and second annular side walls. The annular bridge has an annular tire support surface extending between the first and second annular sidewalls. The annular tire support surface has a first projection. The first projection has at least one first portion and at least one second portion. The second portion has a different size from the first portion.

32 Claims, 21 Drawing Sheets

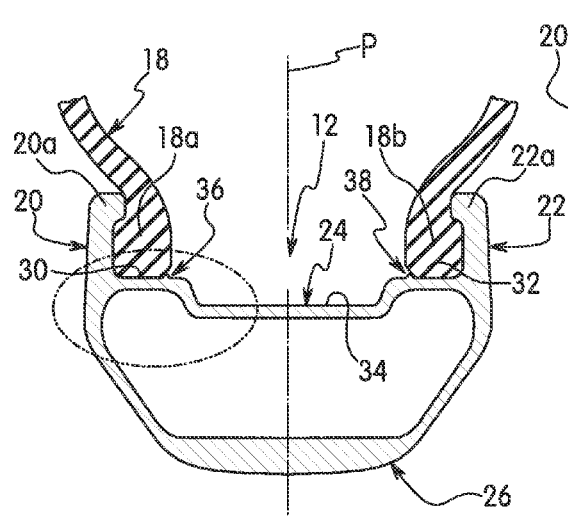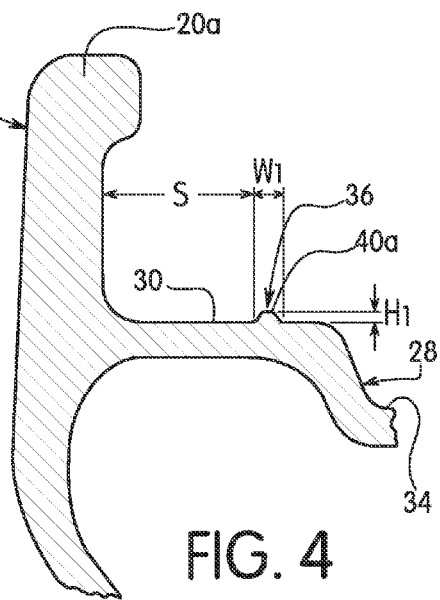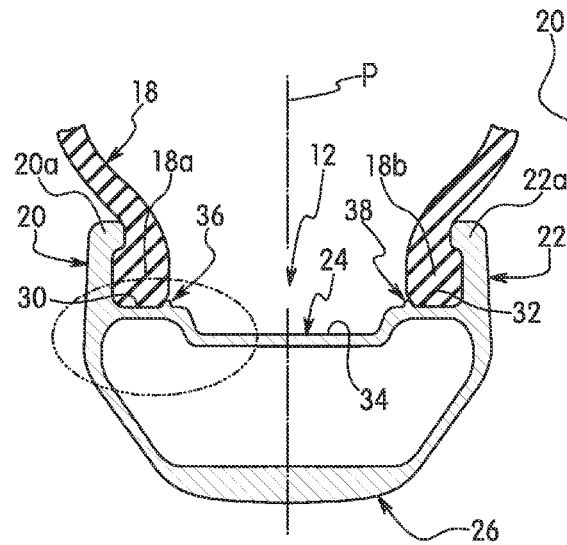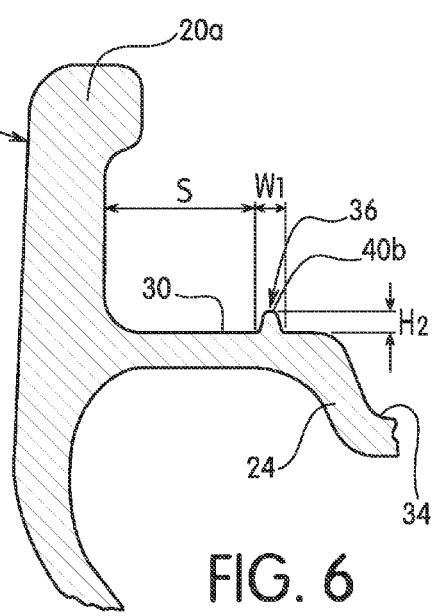

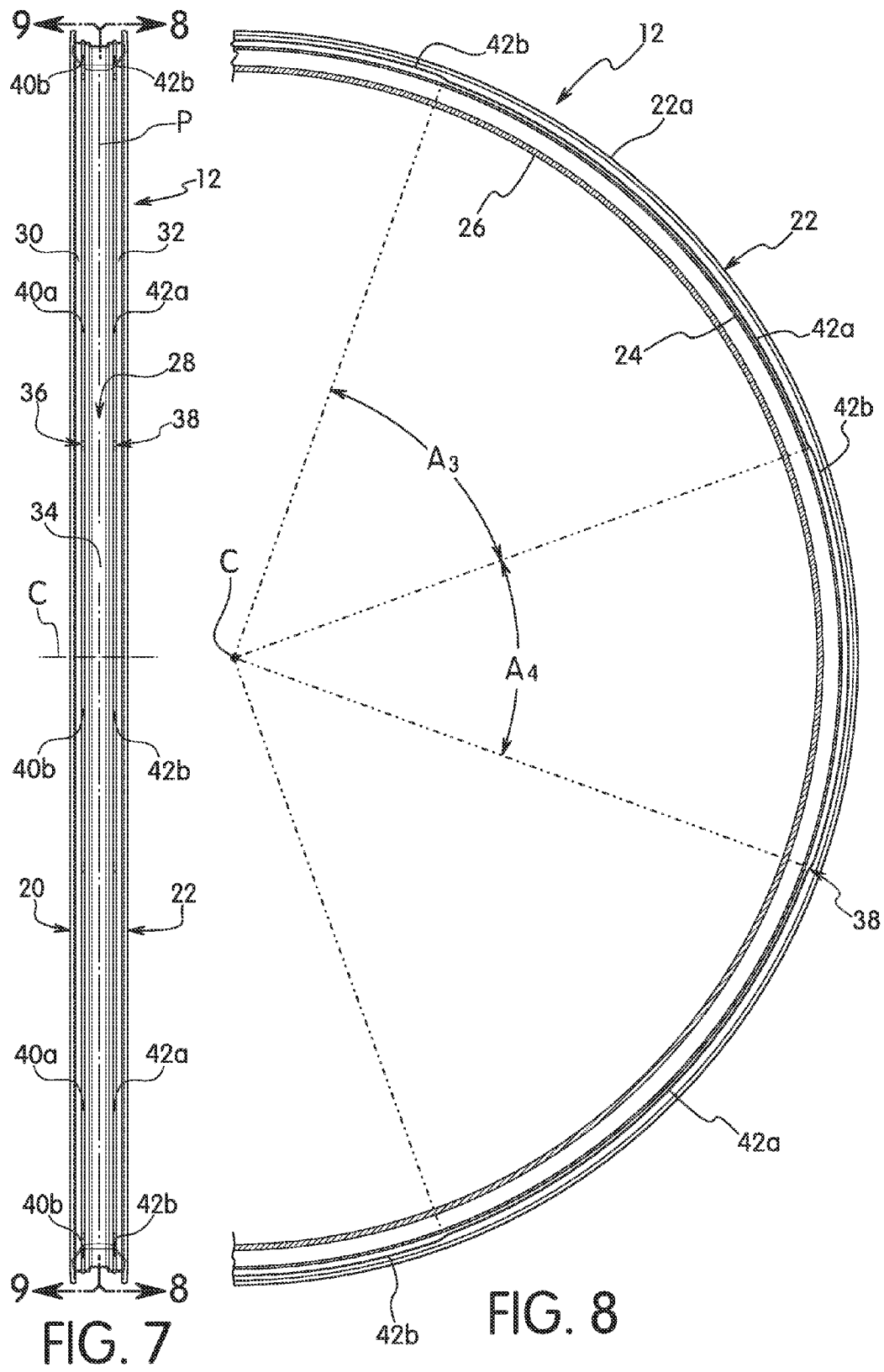

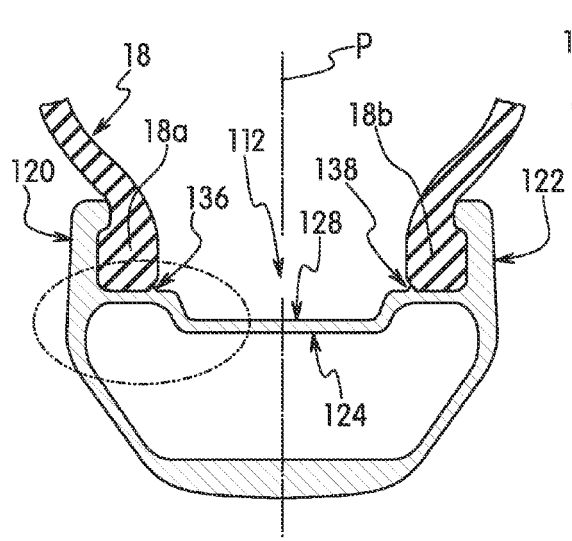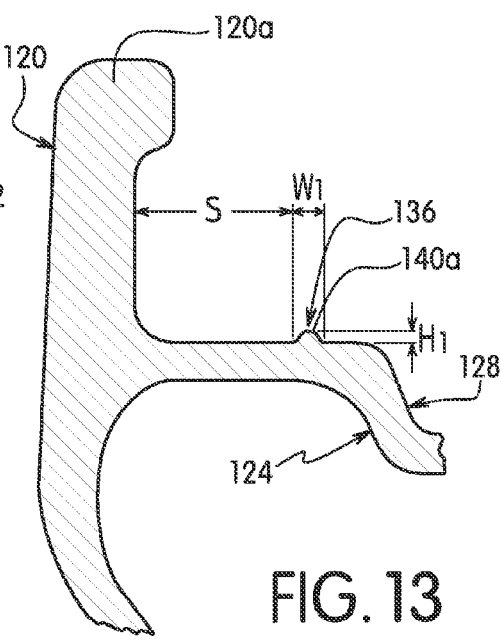
FIG. 12    FIG. 13
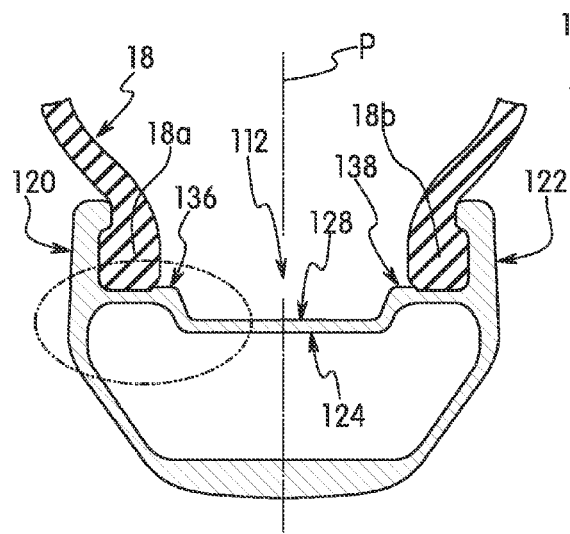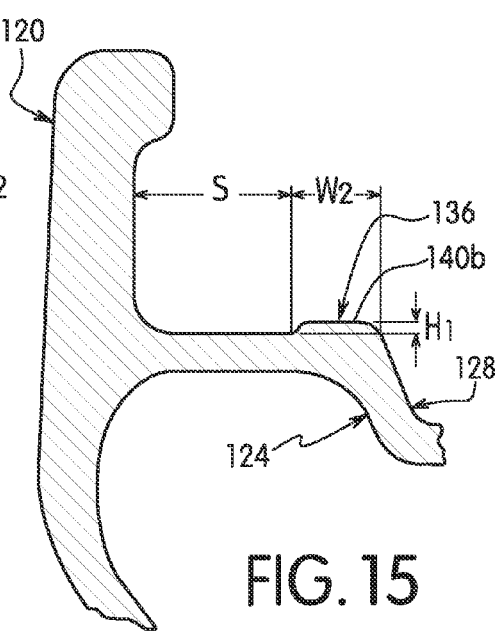
FIG. 14    FIG. 15

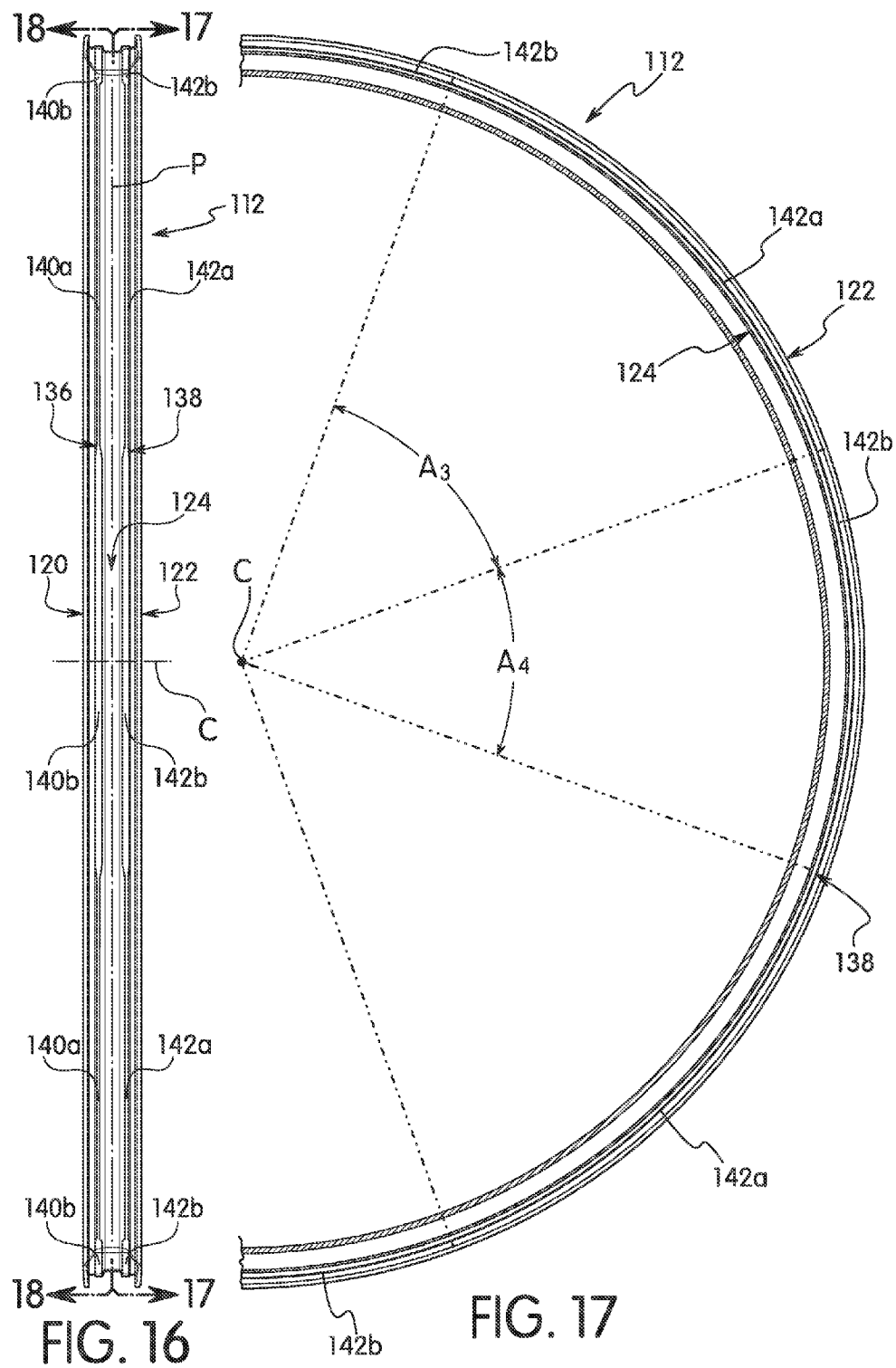

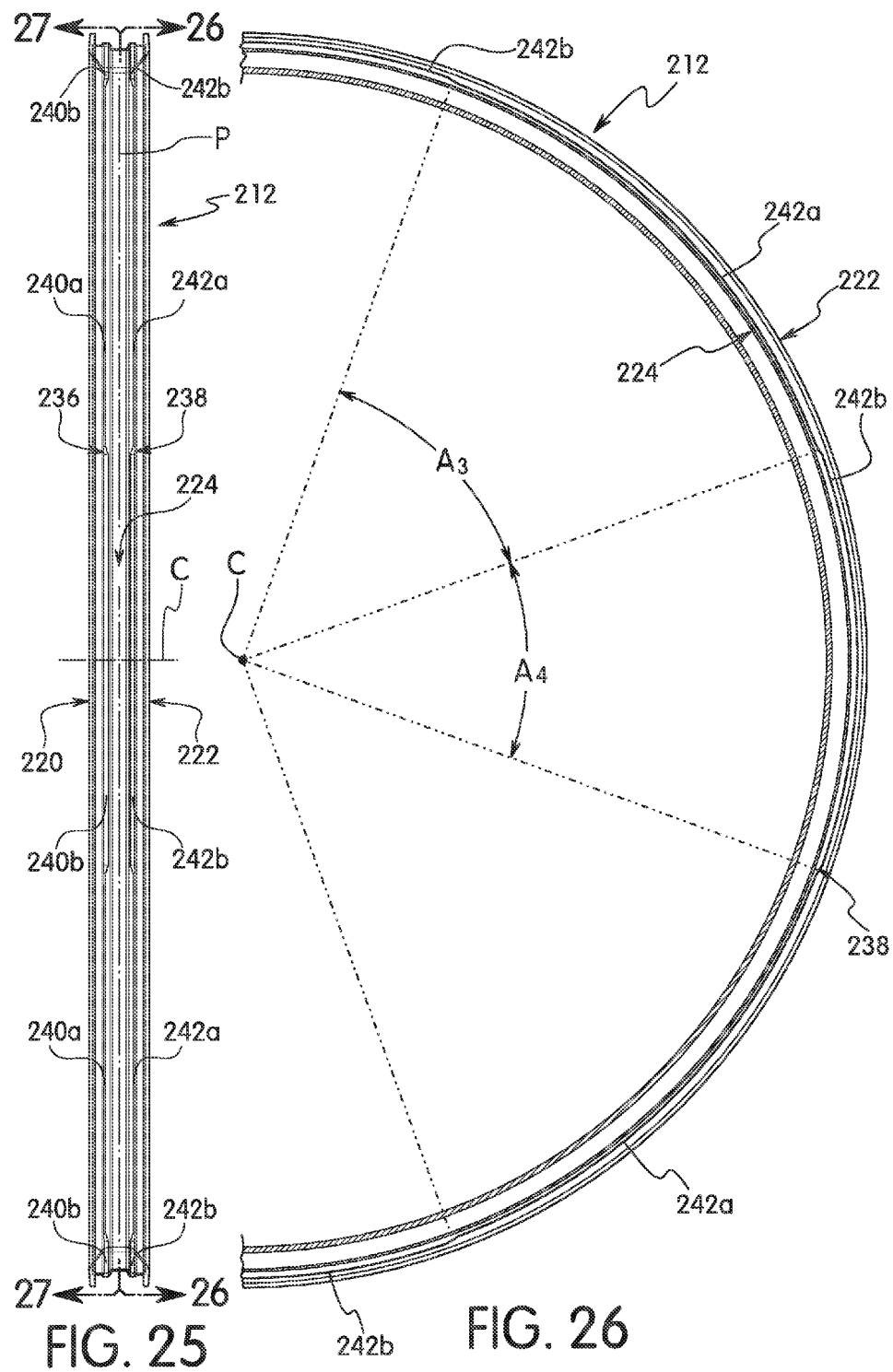

BICYCLE RIM

BACKGROUND

1. Field of the Invention

This invention generally relates to a bicycle rim. More specifically, the present invention relates to a clincher bicycle rim that has a projection with different sized portions to retain a tire bead of a clincher tire.

2. Background Information

A conventional clincher bicycle rim has an annular bridge portion that is an undulated tubular member such that the outer rim surface includes first and second annular tire support surfaces and a recessed center surface. The first and second annular tire support surfaces have projecting edges (e.g., U.S. Pat. No. 6,402,256). The projecting edges are disposed on all around the edges of the annular tire support surfaces, equally and the edges have same structure. (i.e., the same width and height as each other). Also, the edges are uniformly shaped about the circumference of the rim. The projecting edges form tire receiving seats between the edges and the annular sidewalls of the rim. When the tire beads are received in the tire bead receiving seats, the projecting edges aid in retaining the tire beads in the tire bead receiving seats.

SUMMARY

With such a conventional bicycle rim, the projecting edges are low and narrow. Such a configuration makes installation of the tire relatively easy. However, the tire clinching or holding force may not be high enough for some riders. In fact, some riders desire more tire clinching (holding) power (force), especially when tire air pressure is low and/or for when a lateral force is applied to the tire.

If the projecting edges are made bigger (wider width and/or higher height), the desire of some riders for more tire clinching (holding) power (force) would be fulfilled. However, it would be more difficult and complicated to attach and/or detach the tire from the wheel rim.

Accordingly, one object of this disclosure is to provide a bicycle rim, which would maintain the feature of relatively easy assembly and/or disassembly of the tire from the rim but which also increases tire clinching (holding) power (force).

In view of the state of the known technology, a bicycle rim is provided that basically includes a first annular side wall, a second annular side wall and an annular bridge extending between the first and second annular side walls. The annular bridge has an annular tire support surface extending between the first and second annular sidewalls. The annular tire support surface has a first projection. The first projection has at least one first portion and at least one second portion. The second portion has a different size from the first portion.

Other objects, features, aspects and advantages of the disclosed bicycle rim will become apparent to those skilled in the art from the following detailed description, which, taken in conjunction with the annexed drawings, discloses preferred embodiments of the bicycle rim.

BRIEF DESCRIPTION OF THE DRAWINGS

Referring now to the attached drawings which form a part of this original disclosure:

FIG. 3 is an enlarged cross-sectional view of the bicycle rim illustrated in FIGS. 1 and 2, as seen along section line 3-3 of FIG. 2, with tire beads shown for the purpose of illustration;

FIG. 4 is a further enlarged view of a portion of the bicycle rim illustrated in FIG. 3;

FIG. 5 is an enlarged cross-sectional view of the bicycle rim illustrated in FIGS. 1-4, as seen along section line 5-5 of FIG. 2, with tire beads shown for the purpose of illustration;

FIG. 6 is a further enlarged view of a portion of the bicycle rim illustrated in FIG. 5;

FIG. 7 is an enlarged end elevational view of the bicycle rim illustrated in FIGS. 1-6;

FIG. 8 is a partial cross-sectional view of the rim illustrated in FIGS. 1-7, as seen along section line 8-8 of FIG. 7;

FIG. 12 is an enlarged cross-sectional view of the bicycle rim illustrated in FIG. 11, as seen along section line 12-12 of FIG. 11, with tire beads shown for the purpose of illustration;

FIG. 13 is a further enlarged view of a portion of the bicycle rim illustrated in FIG. 12;

FIG. 14 is an enlarged cross-sectional view of the bicycle rim illustrated in FIGS. 11-13, as seen along section line 14-14 of FIG. 11, with tire beads shown for the purpose of illustration;

FIG. 15 is a further enlarged view of a portion of the bicycle rim illustrated in FIG. 14;

FIG. 16 is an enlarged end elevational view of the bicycle rim illustrated in FIGS. 11-15;

FIG. 17 is a partial cross-sectional view of the rim illustrated in FIGS. 11-16, as seen along section line 17-17 of FIG. 16;

FIG. 25 is an enlarged end elevational view of the bicycle rim illustrated in FIGS. 20-24;

FIG. 26 is a partial cross-sectional view of the rim illustrated in FIGS. 20-25, as seen along section line 26-26 of FIG. 25;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
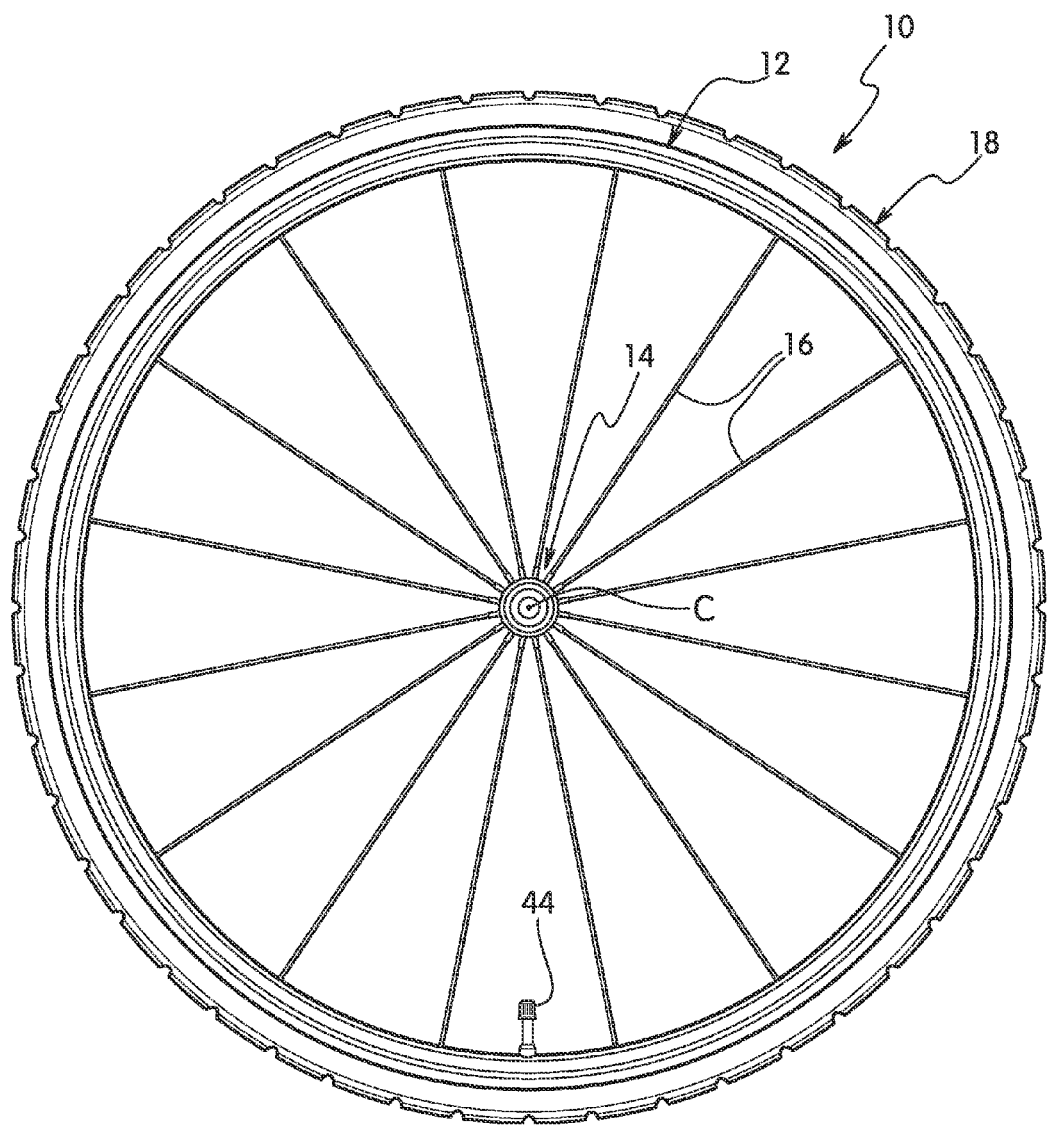
FIG. 1 is a side elevational view of a bicycle wheel equipped with a bicycle rim in accordance with a first embodiment.

Referring initially to FIG. 1, a tensioned spoke bicycle wheel 10 equipped with a bicycle rim 12 in accordance with a first embodiment is illustrated. The bicycle wheel 10 basically includes the bicycle rim 12, a bicycle hub 14, a plurality of spokes 16 and a pneumatic bicycle tire 18. The hub 14 is connected to the rim 12 by the spokes 16, which are placed under tension, in a conventional manner. The pneumatic tire 18 is attached to the outer periphery of the rim 12. The bicycle wheel 10 rotates about a center rotational axis C of the hub 12. The hub 14, the spokes 16 and the pneumatic tire 18 are conventional parts, and thus, will only be briefly explained herein. The rim 12 is suited to a tubeless tire in which an air tight chamber is formed between the outer surface of the rim 12 and the pneumatic tire 18. However, the bicycle rim is also advantageous with tube tires.

Referring to FIGS. 1-6, the bicycle rim 12 basically includes a first annular side wall 20, a second annular side wall 22 and an annular bridge 24 extending between the first and second annular side walls 20 and 22. The bicycle rim 12 is a preferably a clincher tire rim. Thus, the first annular side wall 20 includes a first tire retaining rib or clincher portion 20a, while the second annular side wall 22 includes a second tire retaining rib or clincher portion 22a. The first and second clincher portions 20a and 22a are configured and arranged to retain first and second annular beads 18a and 18b of the pneumatic tire 18 against the annular bridge 24.

In this embodiment, the rim 12 is symmetrically shaped relative to a center plane P passing through the center of the annular bridge 24. However, it will be apparent to those skilled in the art from this disclosure that the rim can be asymmetrical. The rim 12 is constructed of a lightweight rigid material. For example, the rim 12 can be constructed of any suitable metallic material such as plated steel, stainless steel, aluminum, magnesium, titanium, or other suitable metallic alloys (especially those known in the art) as well as other non-metallic materials, such as a carbon fiber composite. The rim 12 is preferably constructed using conventional manufacturing techniques. For example, the rim 12 can be constructed by first extruding a length of material having the cross-sectional shape illustrated in FIG. 3, bending the length of material into an annular shape, and then attaching the ends of the bent length of material together by welding or the like to form the rim 12. The rim 12 can be machined before or after the bending and the attaching the ends in order to achieve the shapes illustrated in FIGS. 2-6. In the illustrated embodiment, the first and second annular side walls 20 and 22 and the annular bridge 24 are preferably formed as a one-piece, unitary member from a suitable metal such as an aluminium alloy. However, the rim 12 can be made of several pieces and of a variety of materials.

Referring to FIGS. 2-10, in this embodiment, the rim 12 preferably further includes an inner annular portion 26 connected to radially inner ends of the first and second annular side walls 20 and 22 to form an annular hollow area disposed radially inwardly of the annular bridge 24. However, it will be apparent to those skilled in the art from this disclosure that the inner annular portion 26 could be eliminated. The spokes 16 can be attached to holes in the annular bridge 24 and extend through holes of the inner annular portion 26. Alternatively, the spokes 16 can be attached to the inner annular portion 26. Spoke nipples can be used at the rim sides of the spokes 16 or at the hub sides of the spokes 16 in a conventional manner. If the tire 18 is a tubeless tire, any openings formed in the annular bridge 24 (e.g. spoke attachment or access openings) should be sealed in a conventional manner. In the illustrated embodiment including the inner annular portion 26, the first and second annular side walls 20 and 22, the annular bridge 24 and the inner annular portion 26 are preferably formed as a one-piece, unitary member from a suitable metal such as an aluminum alloy as explained above. However, the rim 12 can be made of several pieces and of a variety of materials.

Referring still to FIGS. 2-10, the annular bridge portion 24 is an undulated tubular member that includes an annular tire support surface (outer rim surface) 28. The annular tire support surface 28 includes first annular tire seat section 30 and a second annular tire seat section 32 disposed adjacent the first and second annular side walls 20 and 22. The annular tire support surface 28 also preferably includes an annular recessed center 34 disposed between the first tire seat section 30 and the second tire seat section 32. The annular tire support surface 28 preferably includes a first projection 36 and a second projection 38 disposed between the recessed center 34 and the first and second tire seat sections 30 and 32, respectively. As shown in FIGS. 2-6, 8 and 9, the first and second projections 36 and 38 project radially outwardly from the first and second tire seat sections 30 and 32, and are spaced a distance S from the first and second annular sidewalls 20 and 22, respectively. The recessed center 34 is a concaved section that forms an annular recess. The first and second tire seat sections 30 and 32 contact the first and second annular beads 18a and 18b of the pneumatic tire 18 to create a seal therebetween.

The first and second projections 36 and 38 are disposed between the recessed center 34 and the first and second annular side walls 20 and 22, respectively. In this embodiment, the first and second projections 36 and 38 are connected to the recessed center by connecting surfaces (unnumbered) that are aligned with the first and second tire seat sections 30 and 32. However, it will be apparent to those skilled in the art from this disclosure that various shapes of connecting surface can be utilized, with the illustrated connecting sections being merely one preferably example. In this embodiment, the rim 12 is a symmetrical rim, and thus, the first and second projections 36 and 38 are generally identical (i.e., mirror images of each other). Therefore, the descriptions and illustrations of either of the first and second projections 36 and 38 also apply to the other of the first and second projections 36 and 38, except as explained and illustrated herein.

The first and second projections 36 and 38 are spaced from the first and second annular sidewalls 20 and 22, respectively.

The first and second annular side walls 20 and 22 have clincher portions 20a and 22a, respectively, disposed along an outer peripheral edge to form first and second tire bead receiving recesses between the clincher portions 20a and 22a and the first and second projections 36 and 38.

Referring now to FIGS. 2-7, 9 and 10, the first projection 36 will now be explained in more detail. The first projection 36 has at least one first portion 40a and at least one second portion 40b, and the second portion 40b has a different size from the first portion 40a. The second portion 40b preferably has a projecting height $H_2$ different from a projecting height $H_1$ of the first portion 40a. The projecting heights $H_1$ and $H_2$ are measured radially (relative to the rotation axis C) along a direction parallel to the plane P from the tire seat section 30 of the annular tire support surface 28, as shown in FIGS. 4 and 6.

Preferably, the projecting height of the second portion 40b is at least two times the projecting height $H_1$ of the first portion 40a. Moreover, preferably the projecting height $H_2$ of the second portion 40b is no more than about three times the projecting height $H_1$ of the first portion 40a. Thus, as one example, the projecting height $H_1$ of the first portion 40a is 0.35 mm, and the projecting height $H_2$ of the second portion 40b is 0.70 mm to 1.0 mm. In the illustrated embodiment, the projecting height $H_2$ of the second portion 40b is preferably 0.70 mm (e.g. two times the projecting height $H_1$, which is preferably 0.35 mm). However, it will be apparent to those skilled in the art from this disclosure that the drawings are not necessarily drawn to scale and may be exaggerated for the purpose of illustration.

Figure 2:
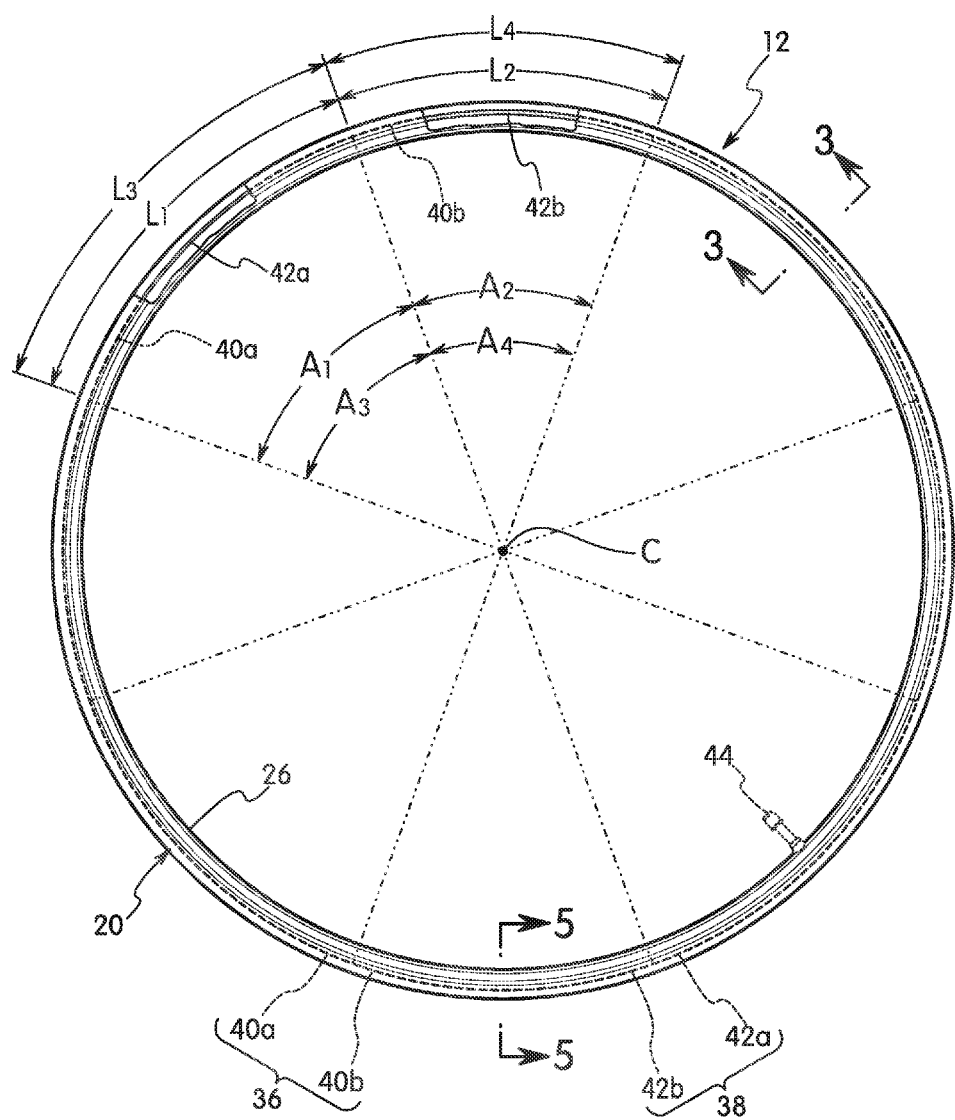
FIG. 2 is a side elevational view of the bicycle rim illustrated in FIG. 1.
Figure 9:
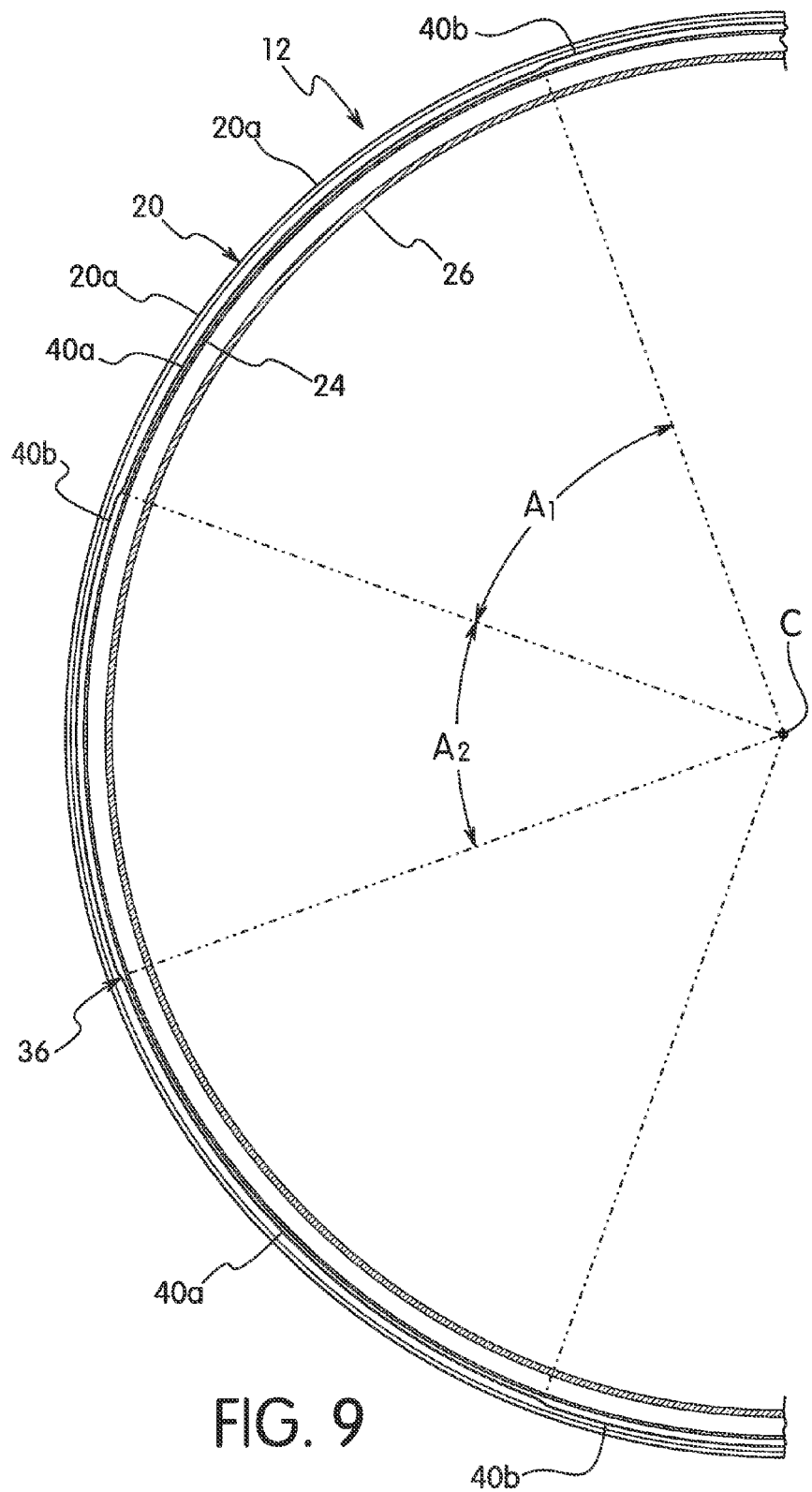
FIG. 9 is a partial cross-sectional view of the rim illustrated in FIGS. 1-7, as seen along section line 9-9 of FIG. 7.
Figure 10:
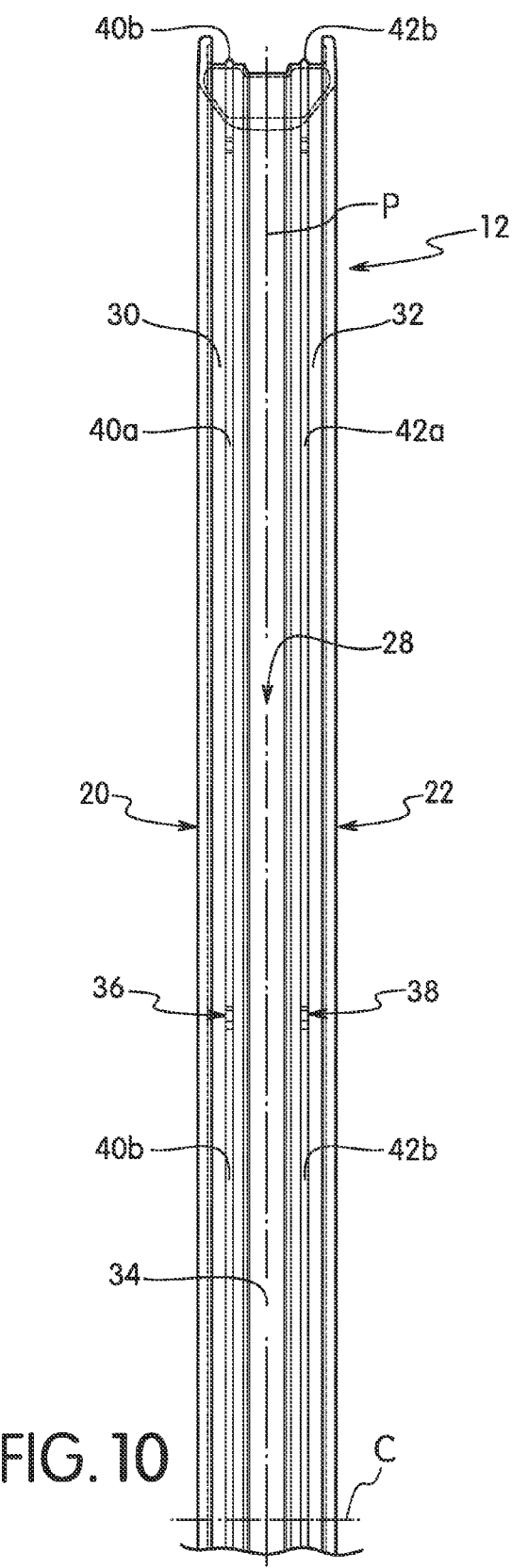
FIG. 10 is an enlarged view of a portion of the rim illustrated in FIG. 7.
Figure 11:
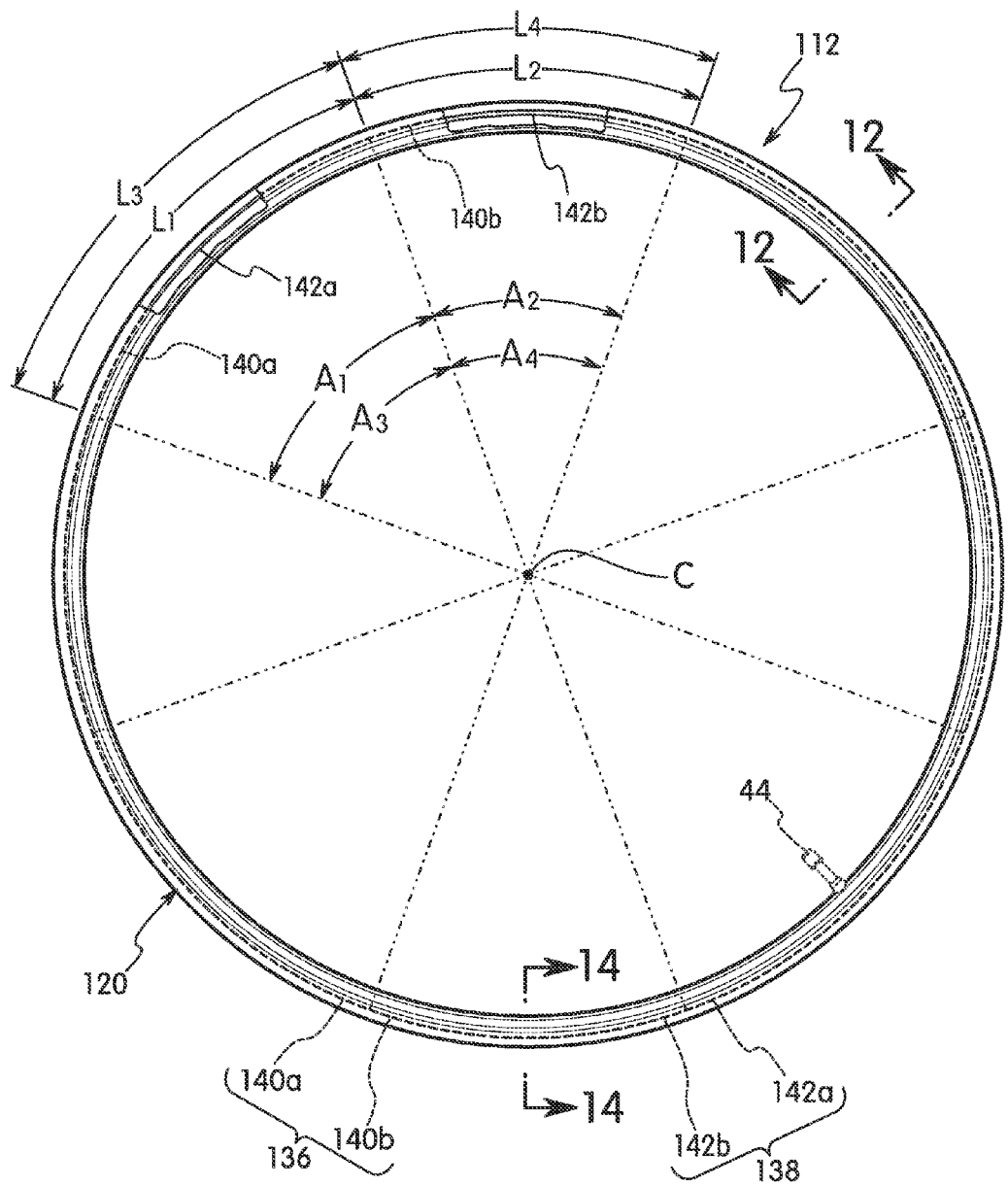
FIG. 11 is a side elevational view of a bicycle rim in accordance with a second embodiment.
Figure 18:
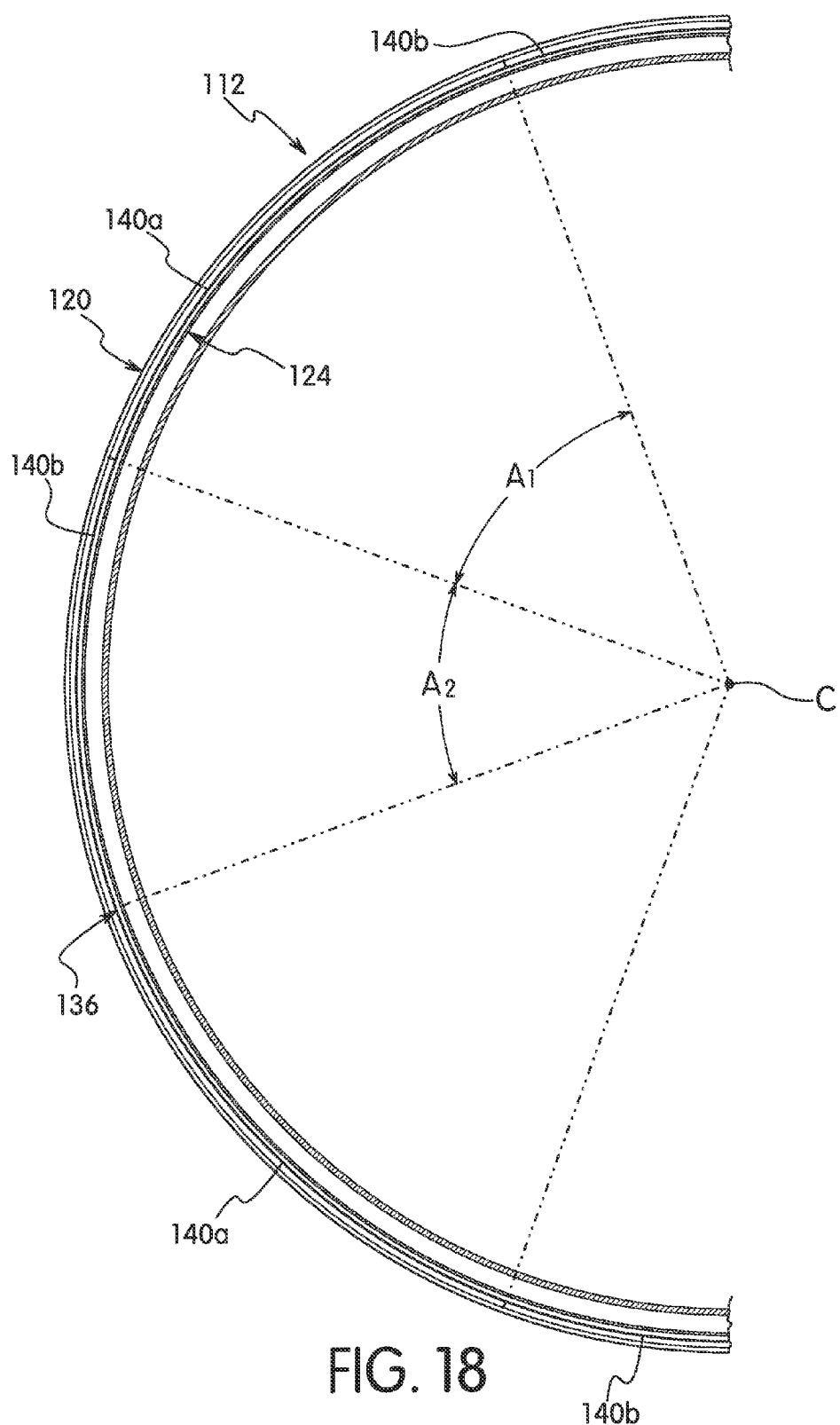
FIG. 18 is a partial cross-sectional view of the rim illustrated in FIGS. 11-16, as seen along section line 18-18 of FIG. 16.
Figure 19:
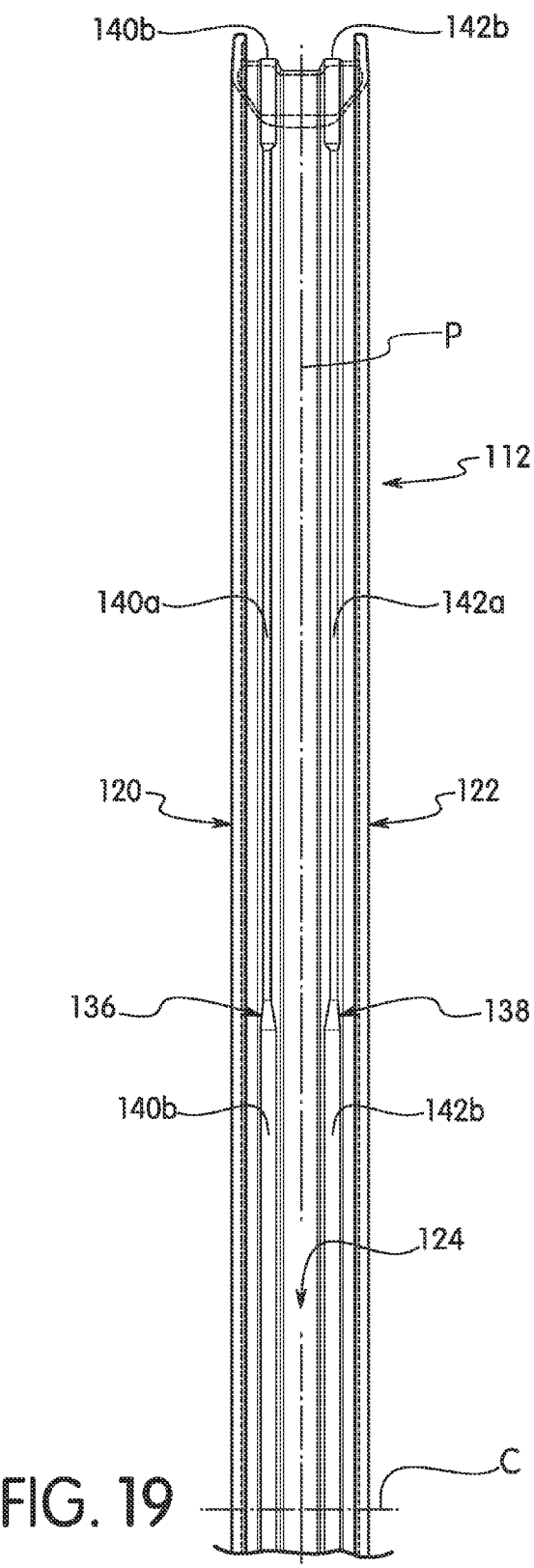
FIG. 19 is an enlarged view of a portion of the rim illustrated in FIG. 16.
Figure 20:
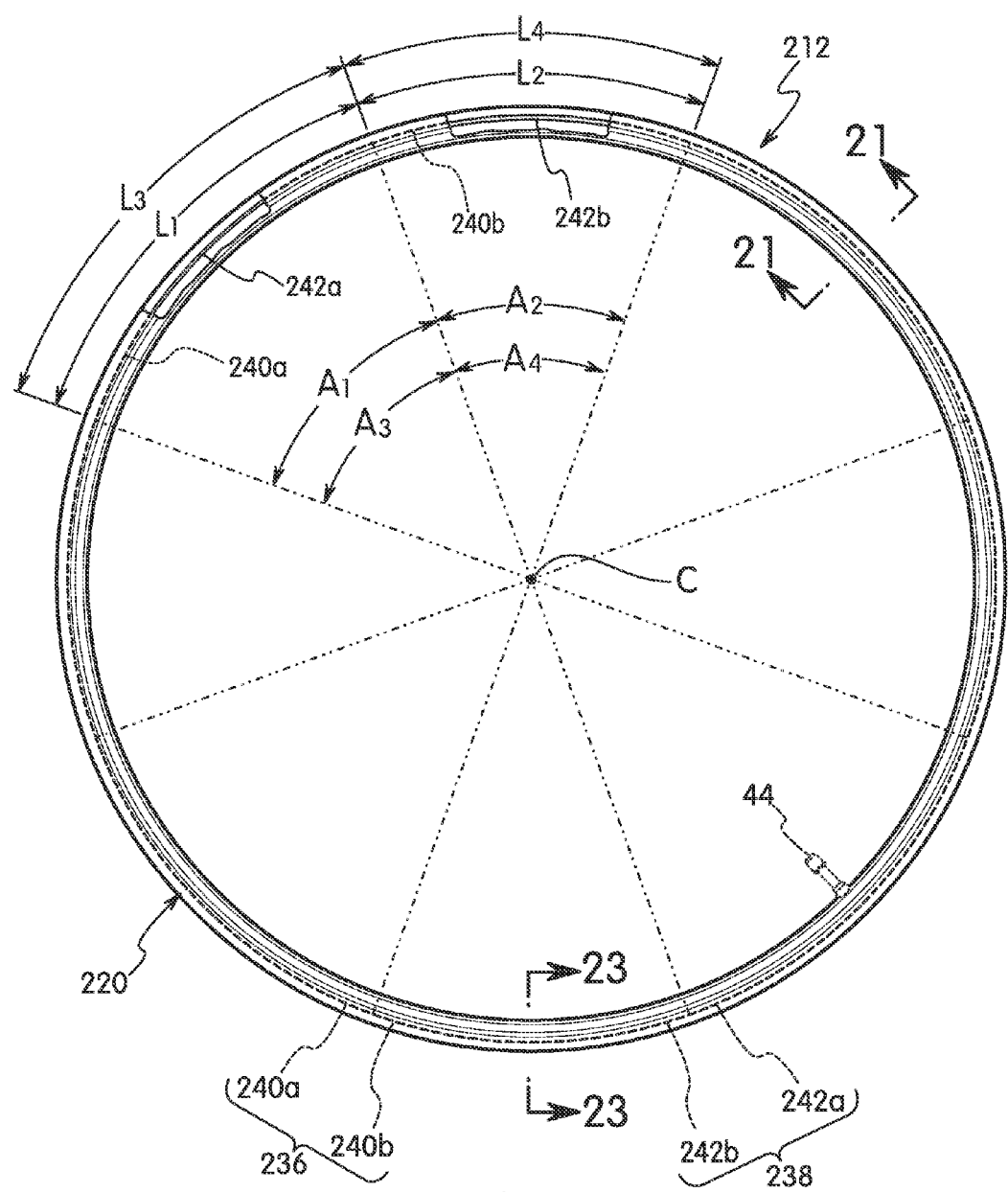
FIG. 20 is a side elevational view of the bicycle rim in accordance with a third embodiment.
Figure 21:
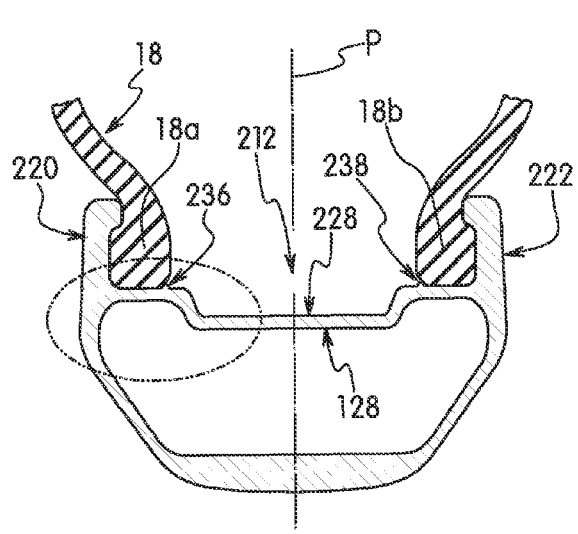
FIG. 21 is an enlarged cross-sectional view of the bicycle rim illustrated in FIG. 20, as seen along section line 21-21 of FIG. 20, with tire beads shown for the purpose of illustration.
Figure 22:
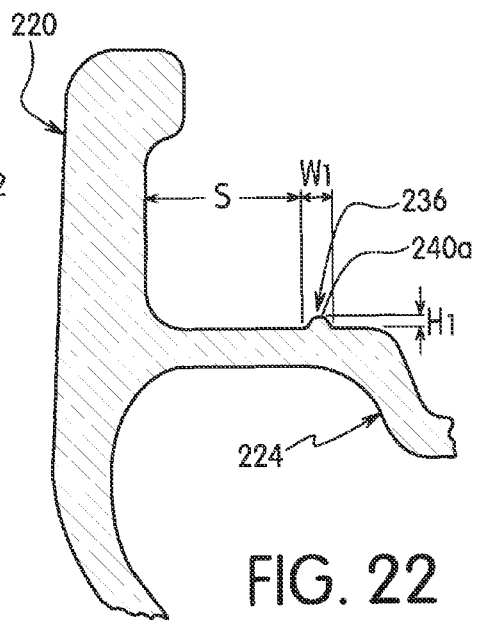
FIG. 22 is a further enlarged view of a portion of the bicycle rim illustrated in FIG. 21.
Figure 23:
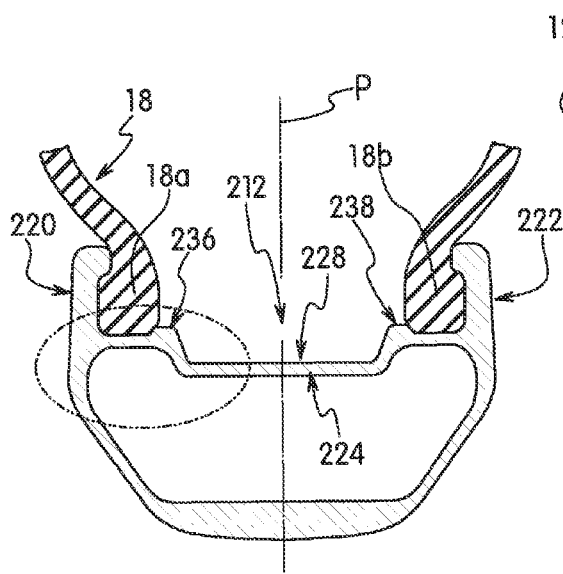
FIG. 23 is an enlarged cross-sectional view of the bicycle rim illustrated in FIGS. 20-22, as seen along section line 23-23 of FIG. 20, with tire beads shown for the purpose of illustration.
Figure 24:
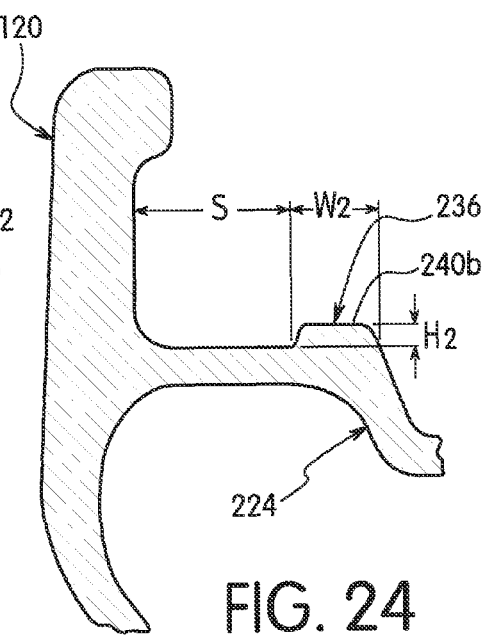
FIG. 24 is a further enlarged view of a portion of the bicycle rim illustrated in FIG. 23.
Figure 27:
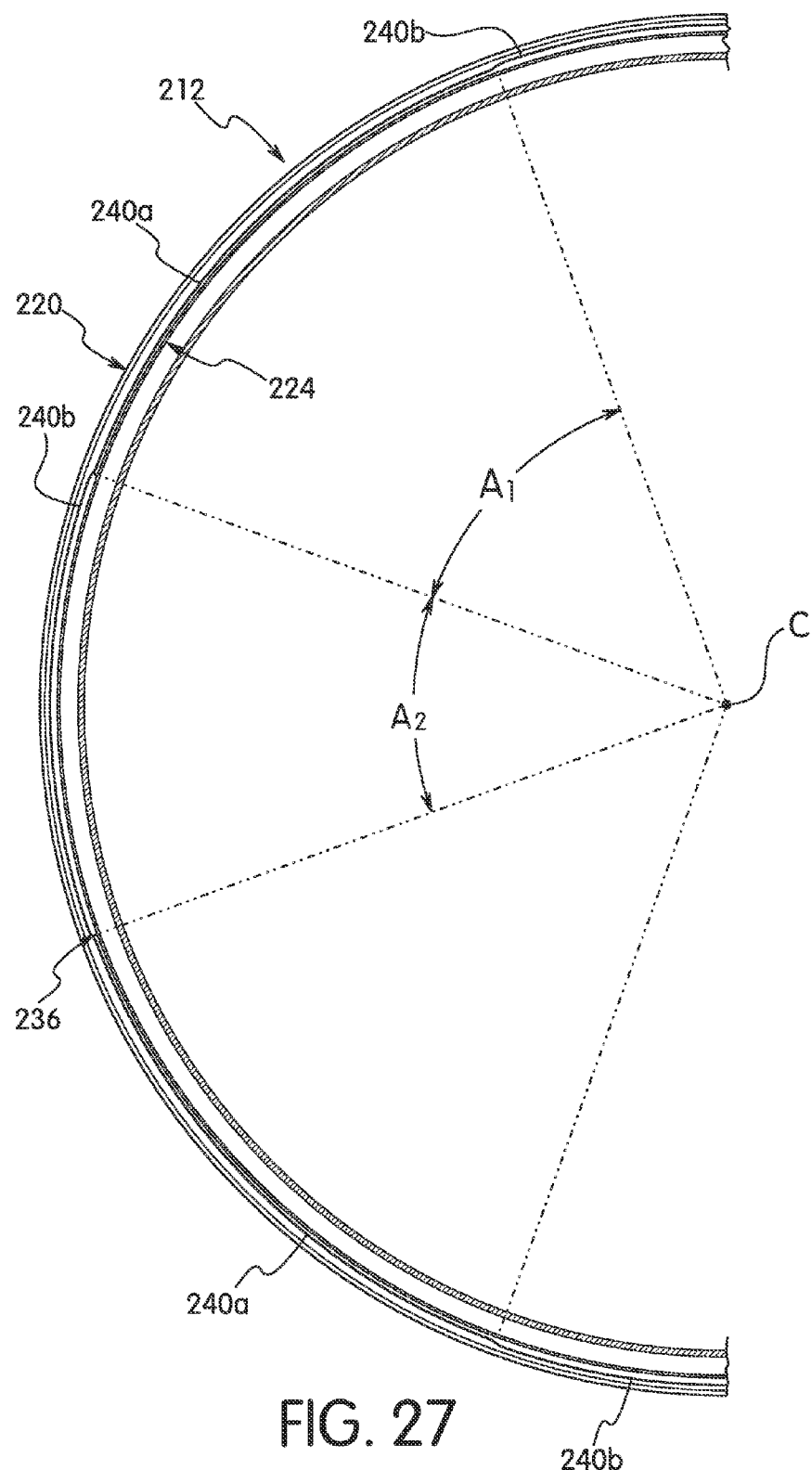
FIG. 27 is a partial cross-sectional view of the rim illustrated in FIGS. 20-25, as seen along section line 27-27 of FIG. 25.
Figure 28:
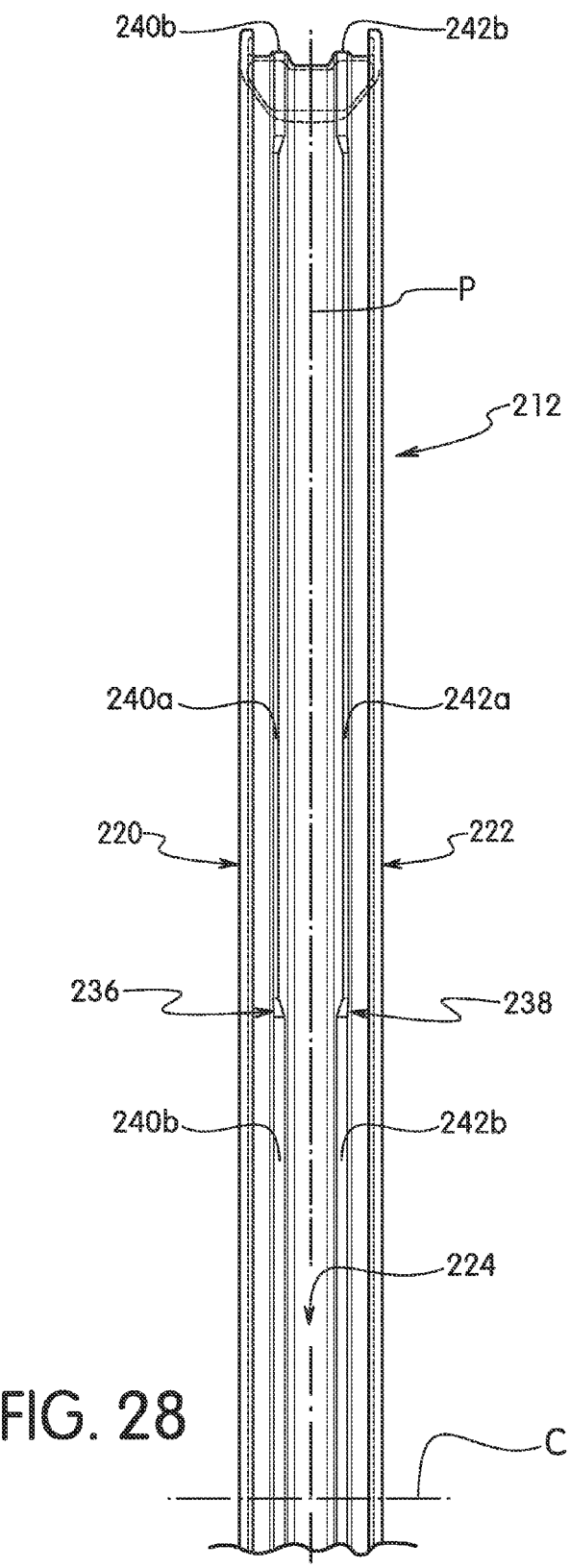
FIG. 28 is an enlarged view of a portion of the rim illustrated in FIG. 25.

As best seen in FIG. 2, a second circumferential length $L_2$ (of the at least one second portion 40b is (preferably different from a first circumferential length $L_1$ of the at least one first portion 40a. Also, as best understood from FIGS. 2 and 9, the circumferential length $L_2$ of the at least one second portion 40b is shorter than the circumferential length $L_1$ of the at least one first portion 40a. In the illustrated embodiment, a first angle $A_1$ defining the first circumferential length $L_1$ of the first portion 40a is preferably fifty degrees, while a second angle $A_2$ defining the second circumferential length $L_2$ of the second portion 40b is preferably forty degrees. Of course, the actual circumferential lengths $L_1$ and $L_2$ will depend on the diameter of the rim 12. However, the actual circumferential lengths $L_1$ and $L_2$ are preferably formed based on the first and second angles $A_1$ and $A_2$.

Referring to FIGS. 2, 7, 9 and 10, preferably, the first projection 36 has a plurality of the first portions 40a and a plurality of the second portions 40b, with the first and second portions 40a and 40b disposed to circumferentially alternate with each other. A combination of the first and second portions 40a and 40b preferably extend about an entire circumference of the annular tire support surface 28. In other words, the first and second portions 40a and 40b are preferably contiguously connected to each other in a circumferentially alternating manner such that the combination of the first and second portions 40a and 40b form a continuous annular first projection 36. Due to this configuration and the first and second angles $A_1$ and $A_2$ preferably being set as disclosed above, an overall circumferential length of the second portions 40b is shorter than an overall circumferential length of the first portions 40a. In other words, an overall circumferential length of the second portions 40b is equal to a sum of the individual second circumferential lengths $L_2$ (e.g., 40°+40°+40°+40°=160°), while an overall circumferential length of the first portions 40a is equal to a sum of the individual first circumferential lengths $L_1$ (e.g., 50°+50°+50°+50°=200°). Of course, circumferential lengths will be determined not only by the angles by the diameter of the rim. 12.

While the first and second portions 40a and 40b form a continuous annular first projection 36 in this embodiment, it will be apparent to those skilled in the art from this disclosure that the first projection 36 can be discontinuous, i.e., include gaps (or breaks) as needed and/or desired. Moreover, even though in the illustrated embodiment, the first and second portions 40a and 40b preferably extend about an entire circumference of the rim 12, it will be apparent to those skilled in the art from this disclosure that the first projection 36 (the first and second portions 40a and 40b) can be formed only at a certain portion or portions of the rim as needed and/or desired.

Referring to FIGS. 1-10, as mentioned above, the rim 12 in this embodiment is preferably a symmetrical rim. Thus, the second projection 38 is preferably a mirror image of the first projection 36 (e.g. substantially identical to the first projection 36 except its location). Accordingly, the second projection 38 has at least one third portion 42a and at least one fourth portion 42b, with the fourth portion 42b having a different size from the third portion 42a. Also, since the rim 12 is a symmetrical rim, the second portion 40b is circumferentially aligned with the fourth portion 42b, and the first portion 40a is circumferentially aligned with the third portion 42a. The third portion 42a has a projecting height $H_1$ different from a projecting height $H_2$ of the fourth portion 42b. The projecting heights and $H_2$ are measured radially (relative to the rotation axis C) along a direction parallel to the plane P from the tire seat section 32 of the annular tire support surface 28, as shown in FIGS. 4 and 6.

Thus, the projecting height $H_2$ of the fourth portion 42b is preferably at least two times the projecting height $H_1$ of the third portion 42a. Moreover, preferably the projecting height $H_2$ of the fourth portion 42b is no more than about three times the projecting height $H_1$ of the third portion 42a. Thus, as one example, the projecting height $H_1$ of the third portion 42a is 0.35 mm, and the projecting height $H_2$ of the fourth portion 42b is 0.70 mm to 1.0 mm. In the illustrated embodiment, the projecting height $H_2$ of fourth portion 42b is preferably 0.70 mm (e.g. two times the projecting height $H_1$, which is preferably 0.35 mm). However, it will be apparent to those skilled in the art from this disclosure that the drawings are not necessarily drawn to scale and may be exaggerated for the purpose of illustration.

As best seen in FIG. 2, a fourth circumferential length $L_4$ of the at least one fourth portion 42b is preferably different from a third circumferential length $L_3$ of the at least one third portion 42a. Also, as best understood from FIGS. 2 and 8, the circumferential length $L_4$ of the at least one fourth portion 42b is shorter than the circumferential length $L_3$ of the at least one third portion 42a. In the illustrated embodiment, a third angle $A_3$ defining the third circumferential length $L_3$ of the third portion 42a is preferably fifty degrees, while a fourth angle $A_4$ defining the fourth circumferential length $L_4$ of the fourth portion 42b is preferably forty degrees. Of course, the actual circumferential lengths $L_3$ and $L_1$ will depend on the diameter of the rim 12. However, the actual circumferential lengths $L_3$ and $L_4$ are preferably formed based on the third and fourth angles $A_1$ and $A_4$.

Referring to FIGS. 2, 7, 8 and 10, preferably, the second projection 38 has a plurality of the third portions 42a and a plurality of the fourth portions 42b, with the third and fourth portions 42a and 42b disposed to circumferentially alternate with each other. A combination of the third and fourth portions 42a and 42b preferably extend about an entire circumference of the annular tire support surface 28. In other words, the third and fourth portions 42a and 42b are preferably contiguously connected to each other in a circumferentially alternating manner such that the combination of the third and fourth portions 42a and 42b form a continuous annular second projection 38. In addition, the combination of the first and second portions 40a and 40b is circumferentially aligned with the combination of the third and fourth portions 42a and 42b. In other words, each second portion 40b is preferably aligned with one of the fourth portions 42b, while each first portion 40a is preferably aligned with each one of the third portions 42a.

Due to this configuration and the third and fourth angles $A_3$ and $A_4$ preferably being set as disclosed above, an overall circumferential length of the fourth portions 42b is shorter than an overall circumferential length of the third portions 42a. In other words, an overall circumferential length of the fourth portions 42b is equal to a sum of the individual fourth circumferential lengths $L_4$ (e.g., 40°+40°+40°+40°=160°), while an overall circumferential length of the third portions 42a is equal to a sum of the individual third circumferential lengths $L_3$ (e.g., 50°+50°+50°+50°=200°). Of course, circumferential lengths will be determined not only by the angles by the diameter of the rim 12.

While the third and fourth portions 42a and 42b form a continuous annular second projection 38 in this embodiment, it will be apparent to those skilled in the art from this disclosure that the second projection 38 can be discontinuous, i.e., include gaps (or breaks) as needed and/or desired. Moreover, even though in the illustrated embodiment, the third and fourth portions 42a and 42b preferably extend about an entire circumference of the rim 12, it will be apparent to those skilled in the art from this disclosure that the second projection 38 (the third and fourth portions 42a and 42b) can be formed only at a certain portion or portions of the rim 12 as needed and/or desired.

In this embodiment, the third angle $A_3$ is equal to the first angle $A_1$, while the fourth angle $A_4$ is equal to the second angle $A_2$. Thus, the circumferential lengths $L_3$ and $L_4$ are also equal to the circumferential lengths $L_1$ and $L_2$, respectively, since the rim has a uniform diameter. However, it will be apparent to those skilled in the art from this disclosure that the third angle $A_3$ does not have to be equal to the first angle $A_1$, and the fourth angle $A_4$ does not have to be equal to the second angle $A_2$. In any case, the third angle $A_3$ and the first angle $A_1$ are preferably between forty-five and sixty degrees, while the fourth angle $A_4$ and the second angle $A_2$ are preferably between fifteen and sixty degrees. In addition, while the first and third portions 40a and 42a are aligned with each other and the second and fourth portions 40b and 42b are aligned with each other in this embodiment, it will be apparent to those skilled in the art from this disclosure that these portions can be offset from each other, or depending on the angles $A_1$, $A_2$, $A_3$ and $A_4$.

In this embodiment, each of the first portions 40a, second portions 40b, third portions 42a and fourth portions 42b have a projecting width $W_1$ that is the same. In this embodiment, the projecting width $W_1$ is a little more than twice the height $H_1$. As one example, the width $W_1$ is preferably 0.75 mm. However, it will be apparent to those skilled in the art from this disclosure width does not have to be 0.75 mm. The projecting width $W_1$ is measured axially along a direction parallel to the center axis C from locations where the first portions 40a, second portions 40b, third portions 42a and fourth portions 42b project radially beyond the first and second tire seat sections 30 and 32.

Each of the annular bridge 24 and the inner annular portion 26 has a single air valve mounting opening (not shown) for attaching an air filler valve 44 (See FIG. 1) in a conventional manner. In this embodiment, the air valve 44 is preferably located at a position centrally opposed to an aligned pair of the second and fourth portions 40b and 42b to aid in weight balance of the rim 12.

Second Embodiment

Referring now to FIGS. 11-19, a bicycle rim 112 in accordance with a second embodiment will now be explained. The rim 112 is used with the bicycle hub 14, the plurality of spokes 16 and the pneumatic bicycle tire 18 of the first embodiment. The rim 112 preferably includes a first annular side wall 120, a second annular side wall 122 and an annular bridge 124 extending between the first and second annular side walls 120 and 122. The annular bridge 124 has an annular tire support surface 128 extending between the first and second annular sidewalls 120 and 122. The annular tire support surface 128 has a first projection 136, with the first projection 136 having at least one first portion 140a and at least one second portion 140b. The second portion 140b has a different size from the first portion 140a.

Like the first embodiment, the first projection 136 preferably includes a plurality of the first and second portions 140a and 140b alternately arranged circumferentially. Also, in this embodiment (like the first embodiment), the annular tire support surface 128 has a second projection 138, with the second projection 138 having at least one third portion 142a and at least one fourth portion 142b. Like the first embodiment, the second projection 138 preferably includes a plurality of the third and fourth portions 142a and 142b alternately arranged circumferentially.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, the descriptions and illustrations of the first embodiment also apply to this second embodiment, except as explained and illustrated herein. Furthermore, it will be apparent to those skilled in the art from this disclosure that parts of this embodiment that are identical or functionally identical will be given the same reference numerals as the first embodiment but with "100" added thereto.

The bicycle rim 112 is identical to the bicycle rim 12, except the rim 112 includes modified second and fourth portions 140b and 142b that are wider and lower than the second and fourth portions 40b and 42b of the first embodiment. Specifically, the second portion 140b has a projecting width $W_2$ different from the projecting width $W_1$ of a first portion 140a, with the projecting widths $W_1$ (of the first and third portions 140a and 142a) and the projecting widths $W_2$ (of the second and fourth portions 140b and 142b) being measured axially (in a direction parallel to the rotation axis C). In this embodiment, the first and third portions 140a and 142a and the second and fourth portions 140b and 142b all preferably have a height $H_1$ (i.e., have the same height).

More specifically, the projecting width $W_2$ of the second portion 140b is at least two times the projecting width $W_1$ of the first portion 140a. In the illustrated embodiment, the projecting width $W_2$ is more than three times (e.g. 3.33 times) the projecting width $W_1$. Thus, as one example, since the projecting width $W_1$ of the first portion 140a is 0.75 mm, and the projecting width $W_2$ of the second portion 140b is 1.5 mm to about 2.5 mm. In the illustrated embodiment, the projecting width $W_2$ of the second portion 140b is preferably 2.5 mm (e.g. 3.33 times the projecting width $W_1$, which is preferably 0.75 mm). In other words, the projecting width $W_1$ is about 3/10 of the projecting width $W_2$ in the illustrated embodiment. However, it will be apparent to those skilled in the art from this disclosure that the drawings are not necessarily drawn to scale and may be exaggerated for the purpose of illustration.

Likewise, a third portion 142a has a projecting width $W_1$ different from a projecting width $W_2$ of the fourth portion 142b, with the projecting widths $W_1$ and $W_2$ being measured axially. Since the third portion 142a and the fourth portion 142b are mirror images of the first portion 140a and the second portion 140b, respectively, the descriptions and illustrations of the first portion 140a and the second portion 140b also apply to the third portion 142a and the fourth portion 142b, respectively. Also, since this embodiment is identical to the first embodiment, except the rim 112 includes modified second and fourth portions 140b and 142b (i.e., modified cross-sections), it will be apparent to those skilled in the art from this disclosure that the descriptions and illustrations of the first embodiment also apply to this second embodiment, except as described and illustrated herein as mentioned above.

Third Embodiment

Referring now to FIGS. 20-28, a bicycle rim 212 in accordance with a third embodiment will now be explained. The rim 212 is used with the bicycle hub 14, the plurality of spokes 16 and the pneumatic bicycle tire 18 of the first embodiment. The rim 212 preferably includes a first annular side wall 220, a second annular side wall 222 and an annular bridge 224 extending between the first and second annular side walls 220 and 222. The annular bridge 224 has an annular tire support surface 228 extending between the first and second annular sidewalls 220 and 222. The annular tire support surface 228 has a first projection 236, with the first projection 236 having at least one first portion 140a and at least one second portion 240. The second portion 240b has a different size from the first portion 240a.

Like the first embodiment, the first projection 236 preferably includes a plurality of the first and second portions 240a and 240b alternately arranged circumferentially. Also, in this embodiment (like the first embodiment), the annular tire support surface 228 has a second projection 238, with the second projection 238 having at least one third portion 242a and at least one fourth portion 242b. Like the first embodiment, the second projection 238 preferably includes a plurality of the third and fourth portions 242a and 242b alternately arranged circumferentially.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, the descriptions and illustrations of the first embodiment also apply to this second embodiment, except as explained and illustrated herein. Furthermore, it will be apparent to those skilled in the art from this disclosure that parts of this embodiment that are identical or functionally identical will be given the same reference numerals as the first embodiment but with "200" added thereto.

The bicycle rim 212 is identical to the bicycle rim 12, except the rim 212 includes modified second and fourth portions 240b and 242b that are wider than the second and fourth portions 40b and 42b of the first embodiment (like the second and fourth portions 140b and 142b of the second embodiment). However, in this embodiment, the modified second and fourth portions 240b and 242b each have a height $H_2$ that is the same as the height of the second and fourth portions 40b and 42b of the first embodiment (i.e., do not have a lower height like the second embodiment). In other words, the modified second and fourth portions 240b and 242b are like those in the first embodiment, except they are wider.

Specifically, the second portion 240b has a projecting width $W_2$ different from the projecting width $W_1$ of a first portion 240a, with the projecting widths $W_1$ (of the first and third portions 240a and 242a) and the projecting widths $W_2$ (of the second and fourth portions 240b and 242b) being measured axially (in a direction parallel to the rotation axis C). In this embodiment, the first and third portions 240a and 242a each preferably have a height $H_1$, and the second and fourth portions 240b and 242b each preferably have a height $H_2$.

More specifically, the projecting width $W_2$ of the second portion 240b is at least two times the projecting width $W_1$ of the first portion 240a. In the illustrated embodiment, the projecting width $W_2$ is more than three times (e.g. 3.33 times) the projecting width $W_1$. Thus, as one example, since the projecting width $W_1$ of the first portion 240a is 0.75 mm, and the projecting width $W_2$ of the second portion 240b is 1.5 mm to about 2.5 mm. In the illustrated embodiment, the projecting width $W_2$ of the second portion 240b is preferably 2.5 mm (e.g. 3.33 times the projecting width $W_1$, which is preferably 0.75 mm). In other words, the projecting width $W_1$ is about 3/10 of the projecting width $W_2$ in the illustrated embodiment. However, it will be apparent to those skilled in the art from this disclosure that the drawings are not necessarily drawn to scale and may be exaggerated for the purpose of illustration.

Likewise, a third portion 242a has a projecting width $W_1$ different from a projecting width $W_2$ of the fourth portion 242b, with the projecting widths $W_1$ and $W_2$ being measured axially. Since the third portion 242a and the fourth portion 242b are mirror images of the first portion 240a and the second portion 240b, respectively, the descriptions and illustrations of the first portion 240a and the second portion 240b also apply to the third portion 242a and the fourth portion 1242b, respectively. Also, since this embodiment is identical to the first embodiment, except the rim 212 includes modified second and fourth portions 240b and 242b (i.e., modified cross-sections), it will be apparent to those skilled in the art from this disclosure that the descriptions and illustrations of the first embodiment also apply to this second embodiment, except as described and illustrated herein as mentioned above.

Modification (1)

Figure 29:
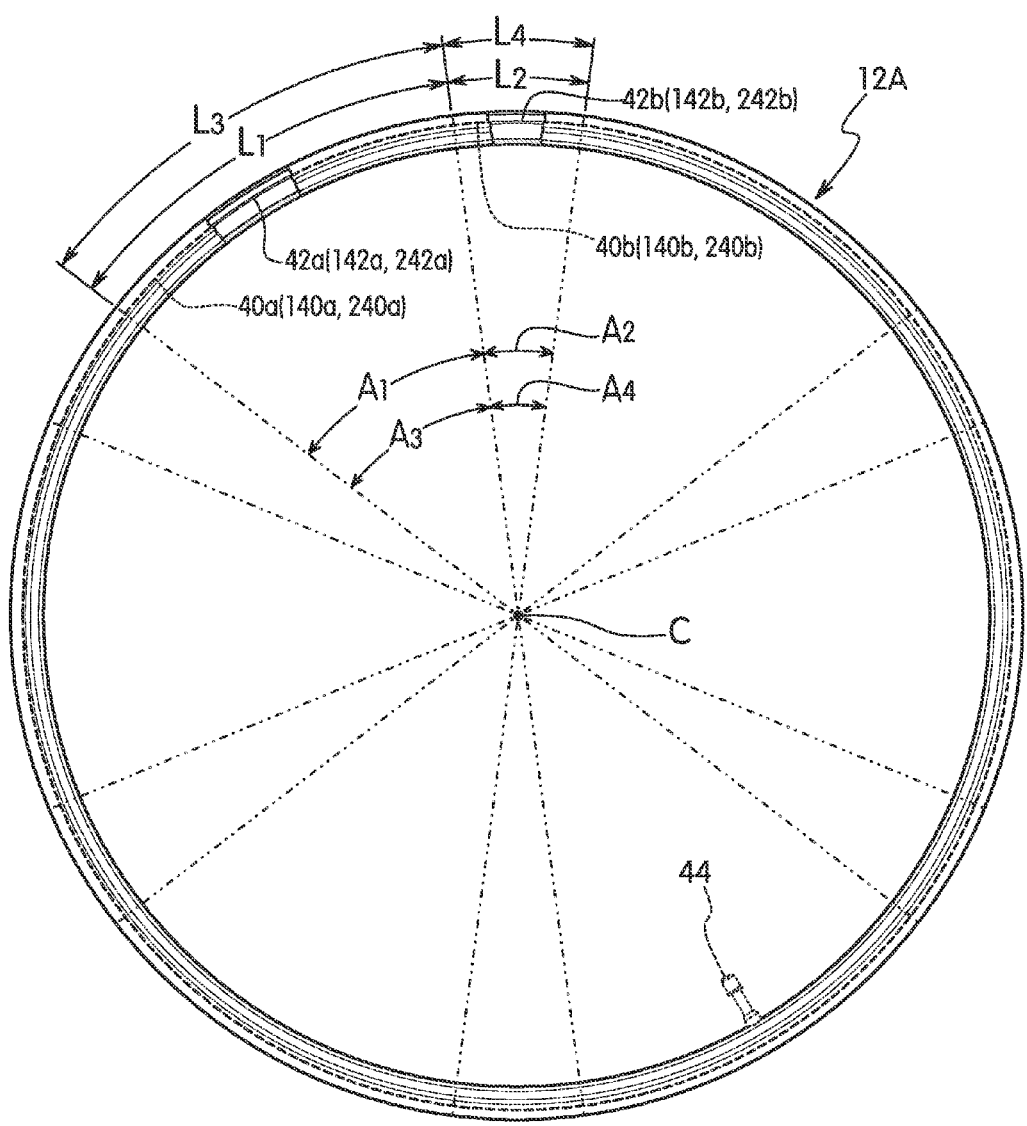
FIG. 29 is a side elevational view of the bicycle rim in accordance with a first modification applicable to the first, second and third embodiments.

Referring to FIG. 29, a rim 12A incorporating modification (1) will now be discussed. Modification (1) is applicable to the first, second and third embodiments. In other words, the first, second and third embodiments can incorporate modification (1), but otherwise remain as described and illustrated herein. In modification (1), the angles $A_1$, $A_2$, $A_3$ and $A_4$ are different than illustrated in the first, second and third embodiments. In particular, the angles $A_1$ and $A_3$ are set to forty-five degrees, while the angles $A_2$ and $A_4$ are set to fifteen degrees. Therefore, modification (1) results in six angles $A_1$ and six angles $A_2$ to define the circumferential lengths $L_1$ and $L_2$ of the first portion 40a (140a, 240a) and the second portion 40b (140b, 240b), respectively, and six angles $A_3$ and six angles $A_4$ to define the circumferential lengths $L_3$ and $L_4$ of the third portion 42a (142a, 242a) and the fourth portion 42b (142b, 242b), respectively.

Due to this configuration of the first and second angles $A_1$ and $A_2$, an overall circumferential length of the second portions 40b (140b, 240b) of the first projection 36 (136, 236) is shorter than an overall circumferential length of the first portions 40a (140a, 240a) of the first projection 36 (136, 236). In other words, an overall circumferential length of the second portions 40b (140b, 240b) is equal to a sum of the individual second circumferential lengths $L_2$ (e.g., 15°+15°+15°+15°+15°+15°=90°), while an overall circumferential length of the first portions 40a (140a, 240a) is equal to a sum of the individual first circumferential lengths $L_1$ (e.g., 45°+45°+45°+45°+45°+45°=270°).

Due to this configuration of the third and fourth angles $A_3$ and $A_4$ preferably being set as disclosed above, an overall circumferential length of the fourth portions 42b (142b, 242b) of the second projection 38 (138, 238) is shorter than an overall circumferential length of the third portions 42a (142a, 242a) of the second projection 38 (138, 238). In other words, an overall circumferential length of the fourth portions 42b (142b, 242b) is equal to a sum of the individual fourth circumferential lengths $L_4$ (e.g., 15°+15°+15°+15°+15°+15°=90°), while an overall circumferential length of the third portions 42a (142a, 242a) is equal to a sum of the individual third circumferential lengths (e.g., 45°+45°+45°+45°+45°+45°=270°). This modification provides less tire clinching (holding) power (force).

Modification (2)

Figure 30:
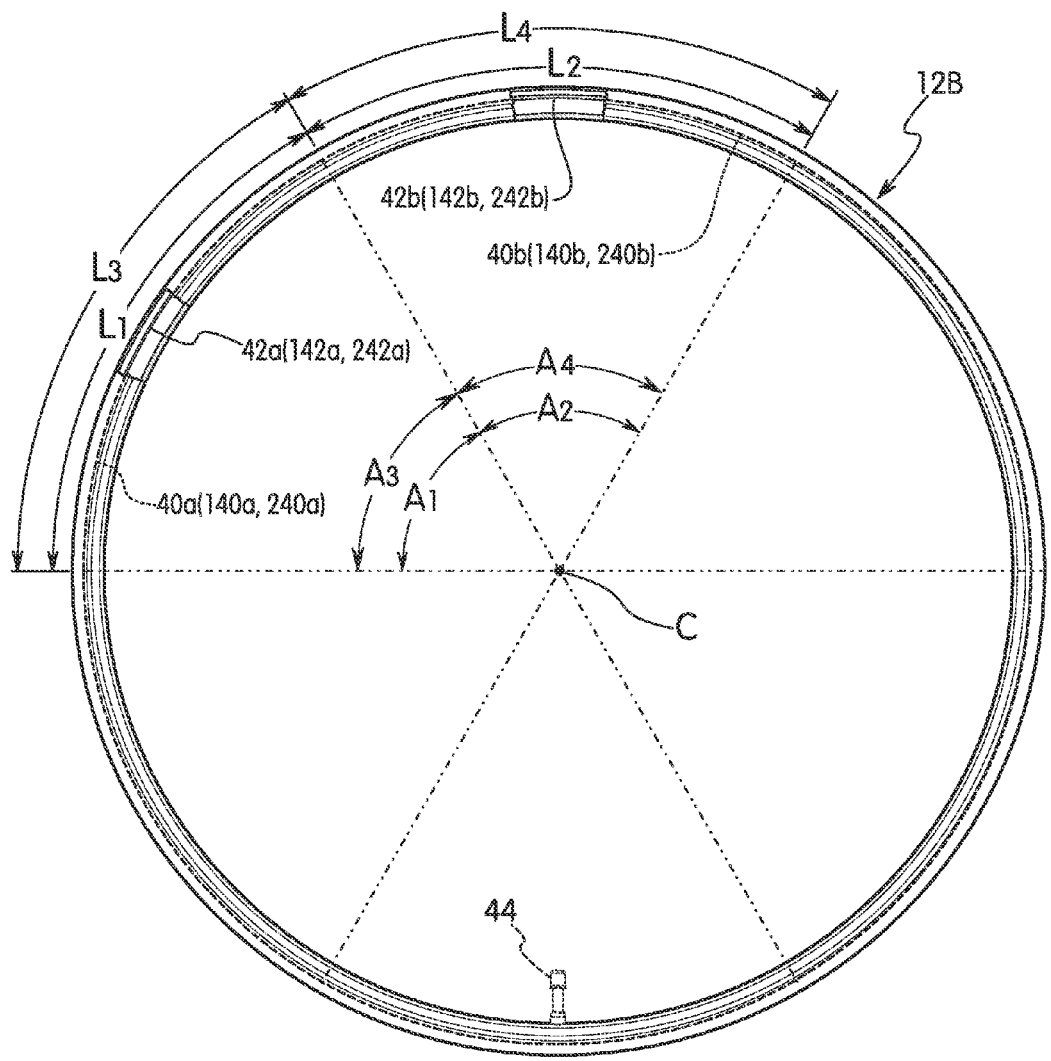
FIG. 30 is a side elevational view of the bicycle rim in accordance with a second modification applicable to the first, second and third embodiments.

Referring to FIG. 30, a rim 12B incorporating modification (2 will now be discussed. Modification (2) is applicable to the first, second and third embodiments. In other words, the first, second and third embodiments can incorporate modification (2), but otherwise remain as described and illustrated herein. In modification (2), the angles $A_1$, $A_2$, $A_3$ and $A_4$ are different than illustrated in the first, second and third embodiments. In particular, the angles $A_1$ and $A_3$ are set to sixty degrees, while the angles $A_2$ and $A_4$ are also set to sixty degrees. Therefore, modification (2) results in three angles $A_1$ and three angles $A_2$ to define the circumferential lengths $L_1$ and $L_2$ of the first portion 40a (140a, 240a) and the second portion 40b (140b, 240b), respectively, and six angles $A_3$ and six angles $A_4$ to define the circumferential lengths $L_3$ and $L_4$ of the third portion 42a (142a, 242a) and the fourth portion 42b (142b, 242b), respectively.

Due to this configuration of the first and second angles $A_1$ and $A_2$, an overall circumferential length of the second portions 40b (140b, 236). In other words, an overall circumferential length of the second portions 40b (140b, 240b) is equal to a sum of the individual second circumferential lengths $L_2$ (e.g., 60°+60°+60°=180°), while an overall circumferential length of the first portions 40a (140a, 240a) is equal to a sum of the individual first circumferential lengths $L_1$ (e.g., 60°+60°+60°=180°).

Due to this configuration of the third and fourth angles $A_3$ and $A_4$ preferably being set as disclosed above, an overall circumferential length of the fourth portions 42b (142b, 242b) of the second projection 38 (138, 238) is the same as (equal to) an overall circumferential length of the third portions 42a (142a, 242a) of the second projection 38 (138, 238). In other words, an overall circumferential length of the fourth portions 42b (142b, 242b) is equal to a sum of the individual fourth circumferential lengths $L_4$ (e.g., 60°+60°+60°=180°), while an overall circumferential length of the third portions 42a (142a, 242a) is equal to a sum of the individual third circumferential lengths $L_3$ (e.g., 60°+60°+60°=180°).

Therefore, a circumferential length $L_2$ of the at least one second portion 40b (140b, 240b) is the same as a circumferential length $L_1$ of the at least one first portion 40a (140a, 240a). Likewise, a circumferential length $L_3$ of the at least one third portion 42a (142a, 242a) is the same as a circumferential length $L_4$ of the at least one fourth portion 42b (142b, 242b). In this modification, the second portions 40b (140b, 240b) are aligned with the fourth portions 42b (142b, 242b), while the first portions 40a (140a, 240a) are aligned with the third portions 42a (142a, 242a). This modification provides more tire clinching (holding) power (force).

Modification (3)

Figure 31:
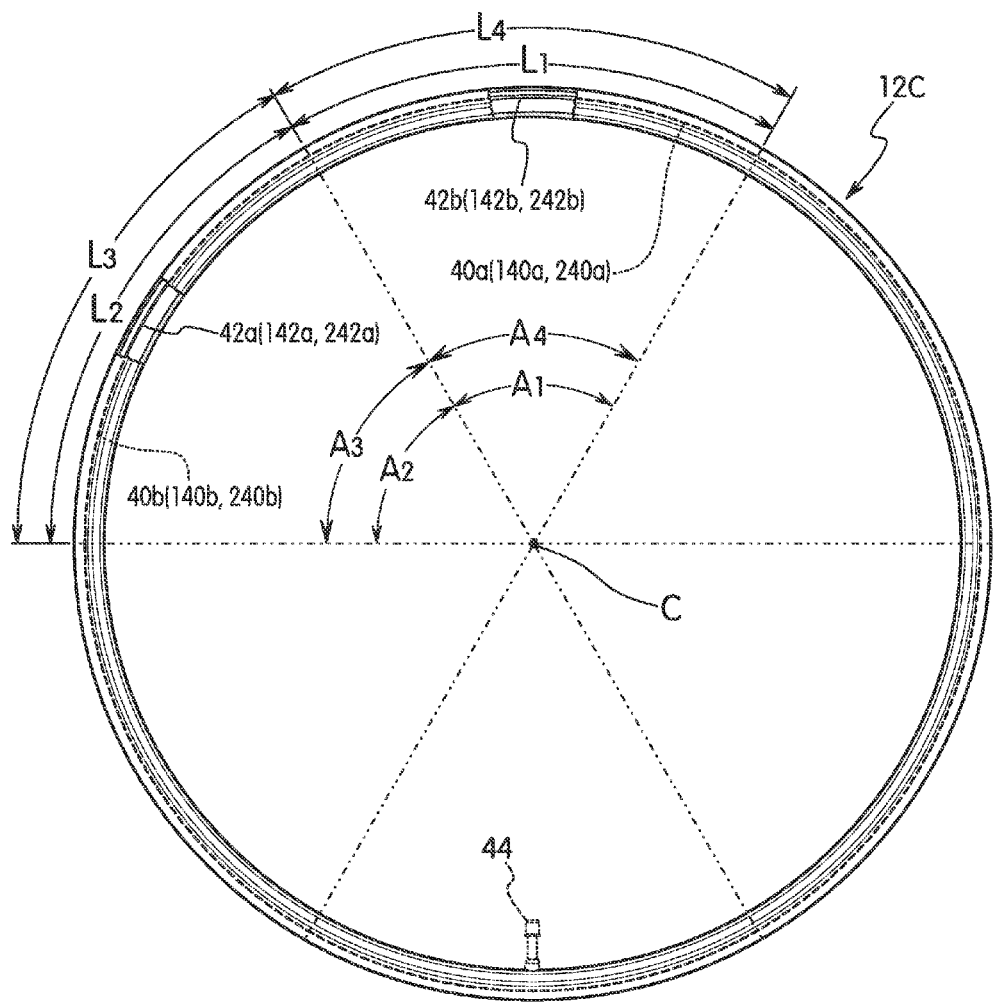
FIG. 31 is a side elevational view of the bicycle rim in accordance with a third modification applicable to the first, second and third embodiments.

Referring to FIG. 31, a rim 12C incorporating modification (3) will now be discussed. Modification (3) is applicable to the first, second and third embodiments. In other words, the first, second and third embodiments can incorporate modification (3), but otherwise remain as described and illustrated herein. Modification (3) is the same as modification (2), except that the angles $A_1$ and $A_2$ are circumferentially offset from the angles $A_3$ and $A_4$. Therefore the descriptions and illustrations of modification (2) also apply to modification (3), except as explained and illustrated herein.

Specifically, the angles $A_1$ are preferably aligned with the angles $A_4$, while the angles $A_2$ are preferably aligned with the angles $A_3$. In other words, the angles $A_1$ and $A_2$ are preferably circumferentially offset sixty degrees from the angles $A_3$ and $A_4$, resulting in an asymmetrical rim. Of course it will be apparent to those skilled in the art from this disclosure that the angles $A_1$ and $A_2$ can be circumferentially offset from the angles $A_3$ and $A_4$ less than sixty degrees (e.g. between one and fifty-nine degrees) if needed and/or desired. As one alternative example, the angles $A_1$ and $A_2$ can be circumferentially offset from the angles $A_3$ and $A_4$ by thirty degrees (not shown) if needed and/or desired. Moreover, it will be apparent to those skilled in the art from this disclosure that the angles $A_1$ and $A_2$ illustrated in the first, second and third embodiments (e.g., forty and fifty degrees) as well as in modification (1) (e.g., fifteen and forty-five degrees) can be circumferentially offset from the angles $A_3$ and $A_4$ illustrated in the first, second and third embodiments (e.g., forty and fifty degrees) as well as modification (1) (e.g., fifteen and forty-five degrees).

In any case, as a result of this arrangement, the second portion 40b (140b, 240b) is offset from the fourth portion 42b (142b, 242b). In addition, the combination of the first portions 40a (140a, 240a) and the second portions 40b (140b, 240b), is preferably circumferentially offset from the combination of the third portions 42a (142a, 242a) and the fourth portions 42b (142b, 242b) in this modification. This modification provides the same tire clinching (holding) power (force) as the second modification but at varied locations on the rim.

Modification (4)

Figure 32:
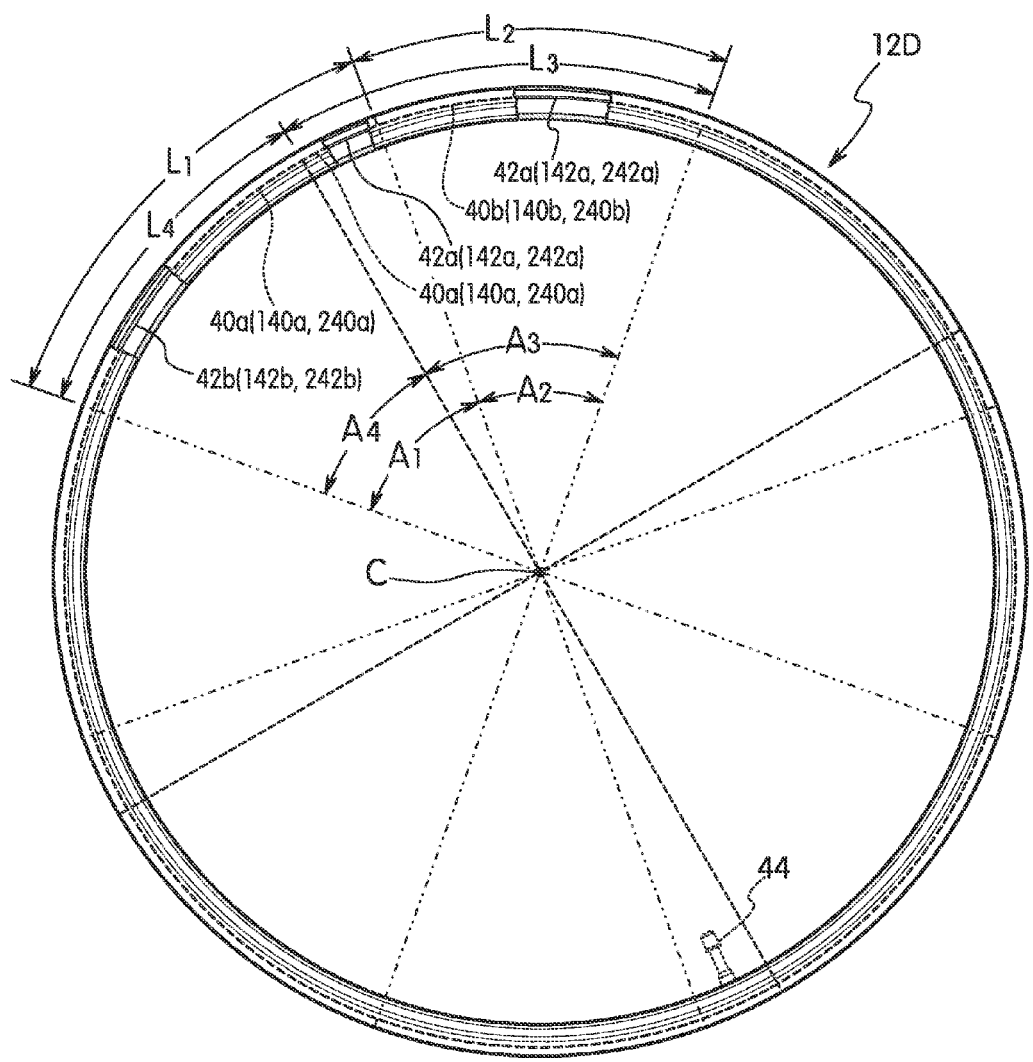
FIG. 32 is a side elevational view of the bicycle rim in accordance with a fourth modification applicable to the first, second and third embodiments.

Referring to FIG. 32, a rim 12D incorporating modification (4) will now be discussed. Modification (4) is applicable to the first, second and third embodiments. In other words, the first, second and third embodiments can incorporate modification (4), but otherwise remain as described and illustrated herein. Modification (4) is similar to modification (3), except that the angles $A_1$ and $A_2$ and the angles $A_3$ and $A_4$ are the same as in the first, second and third embodiments. In other words, the angles $A_1$ and $A_3$ are preferably fifty degrees, and the angles $A_2$ and $A_4$ are preferably forty degrees. However, like modification (4), the angles $A_1$ and $A_2$ are circumferentially offset from the angles $A_1$ and $A_4$. Thus, rim 12D is also an asymmetrical rim. In particular, angle $A_4$ is circumferentially offset fifty degrees from angle $A_2$ in each ninety degree quadrant of the rim 12D (e.g. to form a ten degree gap therebetween). However, the angle $A_2$ is directly adjacent one of the angles $A_4$ in a neighboring ninety degree quadrant, and vice versa. Therefore four ten degree gaps between the angles $A_4$ and $A_2$ are formed about the rim 12D. Also, angle $A_3$ is partially aligned with angle $A_2$ in each ninety degree quadrant of the rim 12D so that the angles $A_3$ is partially aligned with angle $A_1$ (e.g. for about ten degrees), as seen in FIG. 32. This modification provides the same tire clinching (holding) power (force) as the $1^{st}$ to $3^{rd}$ embodiments but at varied locations on the rim. The angles $A_1$ and $A_2$ and the angles $A_3$ and $A_4$ are shown with dashed phantom (dot dot dashed) lines. However, the overlapping regions of angles $A_3$ and $A_1$ are shown with hidden (single dashed) lines for the purpose of illustration.

In view of the similarities between this modification (4) and modification (3), it will be apparent to those skilled in the art from this disclosure that the descriptions and illustrations of the first, second and third embodiments as well as the descriptions and illustrations of modification (3) also apply to modification (4), except as explained and illustrated herein.

Modification (5)

Figure 33:
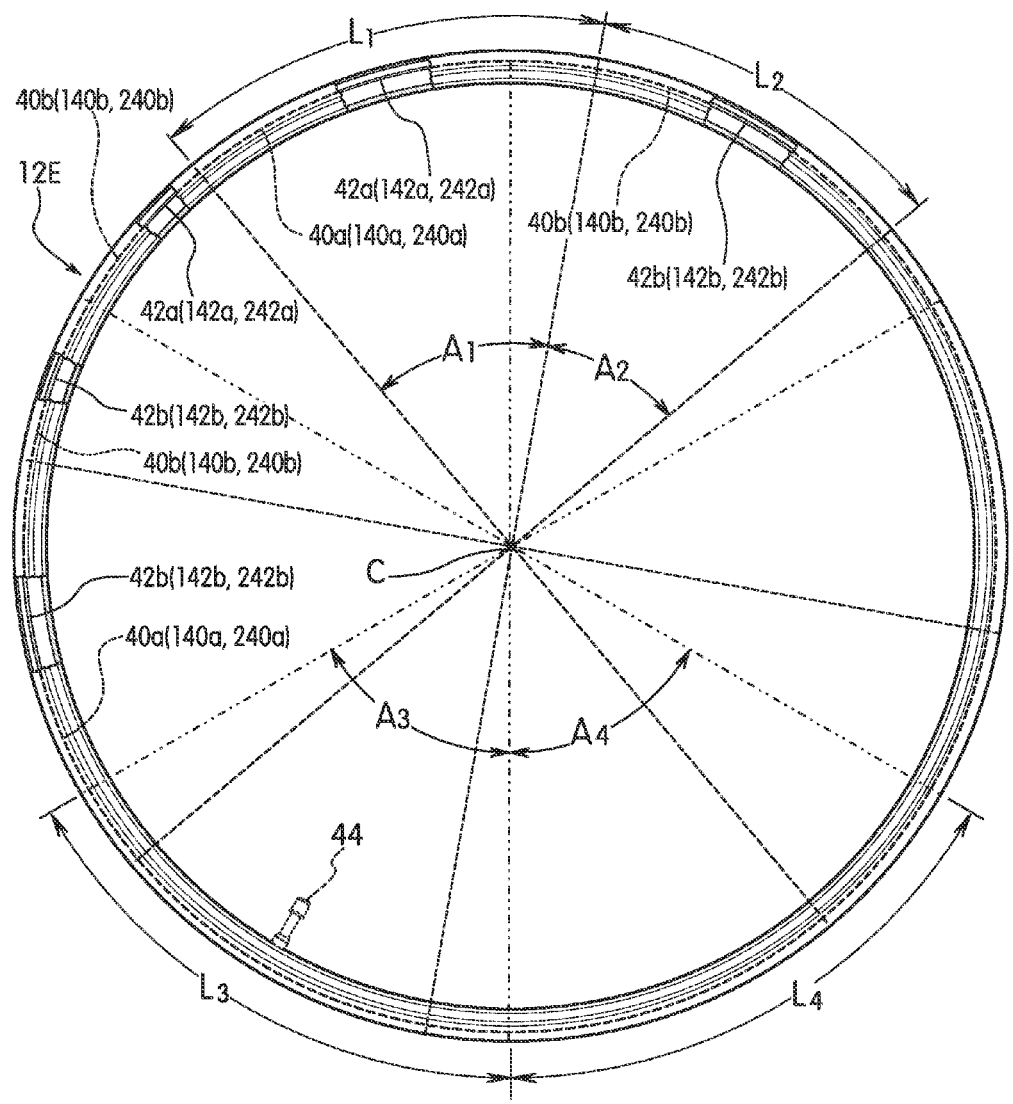
FIG. 33 is a side elevational view of the bicycle rim in accordance with a fifth modification applicable to the first, second and third embodiments.

Referring to FIG. 33, a rim 12E incorporating modification (5) will now be discussed. Modification (5) is applicable to the first, second and third embodiments. In other words, the first, second and third embodiments can incorporate modification (5), but otherwise remain as described and illustrated herein. In modification (5), the angles $A_3$ and $A_4$ are different than described and illustrated in the first, second and third embodiments. The angles $A_1$ and $A_2$ are the same as in the first, second and third embodiments. In addition, like modifications (3) and (4), the angles $A_1$ and $A_2$ are circumferentially offset from the angles $A_3$ and $A_4$.

In particular, the angles $A_1$ and $A_2$ are set to fifty degrees and forty degrees, respectively (like $1^{st}$ to $3^{rd}$ embodiments), while the angles $A_3$ and $A_4$ are set to sixty degrees (like modifications (2)-(3)). Therefore, modification (4) results in four angles $A_1$ and four angles $A_2$ to define the circumferential lengths $L_1$ and $L_2$ of the first portion 40a (140a, 240a) and the second portion 40b (140b, 240b), respectively, and three angles $A_3$ and three angles $A_4$ to define the circumferential lengths $L_3$ and $L_4$ of the third portion 42a (142a, 242a) and the fourth portion 42b (142b, 242b), respectively. The angles $A_1$ and $A_2$ are shown with hidden (single dashed) lines, while the angles $A_3$ and $A_4$ are shown with dashed phantom (dot dot dashed) lines.

Due to this configuration of the first and second angles $A_1$ and $A_2$, an overall circumferential length of the second portions 40b (140b, 240b) of the first projection 36 (136, 236) is shorter than an overall circumferential length of the first portions 40a (140a, 240a) of the first projection 36 (136, 236). In other words, an overall circumferential length of the second portions 40b (140b, 240b) is equal to a sum of the individual second circumferential lengths $L_2$ (e.g., 40°+40°+40°+40°=160°), while an overall circumferential length of the first portions 40a (140a, 240a) is equal to a sum of the individual first circumferential lengths $L_1$ (e.g., 50°+50°+50°+50°=200°).

On the other hand, due to this configuration of the third and fourth angles $A_3$ and $A_4$ preferably being set as disclosed above, an overall circumferential length of the fourth portions 42b (142b, 242b) of the second projection 38 (138, 238) is the same as (equal to) an overall circumferential length of the third portions 42a (142a, 242a) of the second projection 38 (138, 238). In other words, an overall circumferential length of the fourth portions 42b (142b, 242b) is equal to a sum of the individual fourth circumferential lengths $L_4$ (e.g., 60°+60°+60°=180°), while an overall circumferential length of the third portions 42a (142a, 242a) is equal to a sum of the individual third circumferential lengths (e.g., 60°+60°+60°=180°).

Therefore, the second portions 40b (140b, 240b) are circumferentially offset from the fourth portions 42b (142b, 242b). However because of the different sizes of the angles, the circumferential offset amount varies. In other words, two of the second portions 40b (140b, 240b) partially (equally) overlap one fourth portion 42b (142b, 242b) and one third portion 42a (142a, 242a), one of the second portions 401) (140b, 240b) is circumferentially offset from the fourth portions 42b (142b, 242b) and circumferentially aligned with one of the third portions 42a (142a, 242a), and one of the second portions 40b (140b, 240b) is circumferentially aligned with one of the fourth portions 42b (142b, 242b) and circumferentially offset from the third portions 42a (142a, 242a). In either case, at least one of the second portions 40b (140b, 240b) is at least partially circumferentially offset from at least one of the fourth portions 42b (142b, 242b). In the illustration of this modification, the angles $A_1$ and $A_2$ are formed without any common boundaries with the angles $A_3$ and $A_4$. However, it will be apparent to those skilled in the art from this disclosure that various overlapping arrangements can be formed.

In any case, the combination of the first and second portions 40a (140a, 240a) and 40b (140b, 240b) is circumferentially offset from the combination of the third and fourth portions 42a (142a, 242a) and 42b (142b, 242b). Also, an overall circumferential length of the second portions 40b (140b, 240b) is different from an overall circumferential length of the fourth portions 42b (142b, 242b) due to the angles $A_2$ and $A_4$ (e.g., 160 degrees vs. 180 degrees). Therefore, the overall circumferential length of the second portions 40b (140b, 240b) is preferably shorter than overall circumferential length of the fourth portions 42b (142b, 242b). Thus, the combination of the third and fourth portions 42a (142a, 242a) and 42b (142b, 242b) has more tire clinching (holding) power (force) than the combination of the first and second portions 40a (140a, 240a) and 40b (140b, 240b).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed (e.g., manufacturing tolerances).

Also it will be understood that although the terms "first", "second", "third" and "fourth" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
    a first annular side wall;
    a second annular side wall; and
    an annular bridge extending between the first and second annular side walls, the annular bridge having an annular tire support surface extending between the first and second annular sidewalls,
    the annular tire support surface having a first projection and a first tire seat section, the first projection having at least one first portion and at least one second portion, the at least one first portion and the at least one second portion projecting further radially from a rotational axis of the bicycle rim than the first tire seat section, the at least one first portion and the at least one second portion alternating circumferentially about the bicycle rim,
    the at least one second portion having a different size from the at least one first portion,
    the at least one portion and the at least one second disposed on a first side of the bicycle rim respective to a center plane, the center plane being disposed through a center of the annular bridge and perpendicular to the rotational axis of the bicycle rim.

2. The bicycle rim according to claim 1, wherein
    the at least one second portion has a projecting height different from a projecting height of the at least one first portion, the projecting heights being measured radially from the first tire seat section of the annular tire support surface.

3. The bicycle rim according to claim 2, wherein
    the projecting height of the at least one second portion is at least two times the projecting height of the at least one first portion.

4. The bicycle rim according to claim 1, wherein
    the at least one second portion has a projecting width different from a projecting width of the at least one first portion, the projecting widths being measured axially.

5. The bicycle rim according to claim 4, wherein
    the projecting width of the at least one second portion is at least two times the projecting width of the at least one first portion.

6. The bicycle rim according to claim 1, wherein
    a circumferential length of the at least one second portion is the same as a circumferential length of the at least one first portion.

7. The bicycle rim according to claim 1, wherein
    a circumferential length of the at least one second portion is different from a circumferential length of the at least one first portion.

8. The bicycle rim according to claim 7, wherein
    the circumferential length of the at least one second portion is shorter than the circumferential length of the at least one first portion.

9. The bicycle rim according to claim 1, wherein
    the first projection has a plurality of the first portions and a plurality of the second portions.

10. The bicycle rim according to claim 9, wherein
    the first and second portions are disposed to circumferentially alternate with each other.

11. The bicycle rim according to claim 9, wherein
    a combination of the first and second portions extend about an entire circumference of the annular tire support surface.

12. The bicycle rim according to claim 9, wherein
    an overall circumferential length of the second portions is the same as an overall circumferential length of the first portions.

13. The bicycle rim according to claim 9, wherein
    an overall circumferential length of the second portions is different from an overall circumferential length of the first portions.

14. The bicycle rim according to claim 13, wherein
    the overall circumferential length of the second portions is shorter than the overall circumferential length of the first portions.

15. The bicycle rim according to claim 1, wherein
    the annular tire support surface has a second projection, the second projection having at least one third portion and at least one fourth portion, and
    the at least one fourth portion has a different size from the at least one third portion.

16. The bicycle rim according to claim 15, wherein
    the at least one third portion has a projecting height different from a projecting height of the at least one fourth portion, the projecting heights being measured radially from a second tire seat section of the annular tire support surface.

17. The bicycle rim according to claim 15, wherein
    the at least one third portion has a projecting width different from a projecting width of the at least one fourth portion, the projecting widths being measured axially.

18. The bicycle rim according to claim 15, wherein
    the at least one second portion is circumferentially aligned with the at least one fourth portion.

19. The bicycle rim according to claim 15, wherein
    the at least one second portion is circumferentially offset from the at least one fourth portion.

20. The bicycle rim according to claim 15, wherein
    the annular tire support surface has a recessed center disposed between the first and second projections, with the first and second projections being spaced from the first and second annular sidewalls, respectively.

21. The bicycle rim according to claim 20, wherein
    each of the first and second annular side walls has a clincher portion along an outer peripheral edge to form first and second tire bead receiving recesses between the clincher portions and the first and second projections.

22. The bicycle rim according to claim 15, wherein
    the first projection has a plurality of the first portions and a plurality of the second portions, and
    the second projection has a plurality of the third portions and a plurality of the fourth portions.

23. The bicycle rim according to claim 22, wherein
the first and second portions of the first projection are disposed to circumferentially alternate with each other, and
the third and fourth portions of the second projection are disposed to circumferentially alternate with each other.
24. The bicycle rim according to claim 22, wherein
a combination of the first and second portions of the first projection extend about an entire circumference of the annular tire support surface, and
a combination of the third and fourth portions of the second projection extend about an entire circumference of the annular tire support surface.
25. The bicycle rim according to claim 24, wherein
the combination of the first and second portions is circumferentially align with the combination of the third and fourth portions.
26. The bicycle rim according to claim 24, wherein
the combination of the first and second portions is circumferentially offset from the combination of the third and fourth portions.
27. The bicycle rim according to claim 15, wherein
an overall circumferential length of the at least one second portion of the first projection is the same as an overall circumferential length of the at least one first portion of the first projection, and
an overall circumferential length of the at least one fourth portion of the second projection is the same as an overall circumferential length of the at least one third portion of the second projection.
28. The bicycle rim according to claim 15, wherein
an overall circumferential length of the at least one second portion of the first projection is different from an overall circumferential length of the at least one first portion of the first projection, and
an overall circumferential length of the at least one fourth portion of the second projection is different from an overall circumferential length of the at least one third portion of the second projection.
29. The bicycle rim according to claim 28, wherein
the overall circumferential length of the at least one second portion of the first projection is shorter than the overall circumferential length of the at least one first portion of the first projection, and
the overall circumferential length of the at least one fourth portion of the second projection is shorter than the overall circumferential length of the at least one third portion of the second projection.
30. The bicycle rim according to claim 15, wherein
an overall circumferential length of the at least one second portion is the same as an overall circumferential length of the at least one fourth portion.
31. The bicycle rim according to claim 15, wherein
an overall circumferential length of the at least one second portion is different from an overall circumferential length of the at least one fourth portion.
32. The bicycle rim according to claim 31, wherein
the overall circumferential length of the at least one second portion is shorter than the overall circumferential length of the at least one fourth portion.

* * * * *